United States Patent [19]
Young

[11] Patent Number: 5,825,597
[45] Date of Patent: Oct. 20, 1998

[54] SYSTEM AND METHOD FOR DETECTION AND CONTROL OF CIRCULATING CURRENTS IN A MOTOR

[75] Inventor: Glen C. Young, Fort Wayne, Ind.

[73] Assignee: General Electric Company, Fort Wayne, Ind.

[21] Appl. No.: 719,732

[22] Filed: Sep. 25, 1996

[51] Int. Cl.⁶ .................................................. H02H 5/04
[52] U.S. Cl. ........................ 361/31; 318/806; 318/811
[58] Field of Search ............................. 361/31, 93–94, 361/98; 363/56, 58; 318/801, 802, 720, 767, 798, 806, 811

[56] References Cited

U.S. PATENT DOCUMENTS

| | | | |
|---|---|---|---|
| 3,955,130 | 5/1976 | Graf | 318/332 |
| 4,015,182 | 3/1977 | Erdman | 318/334 |
| 4,047,083 | 9/1977 | Plunkett | 318/231 |
| 4,167,693 | 9/1979 | Liska et al. | 318/138 |
| 4,250,435 | 2/1981 | Alley et al. | 318/138 |
| 4,250,544 | 2/1981 | Alley | 364/110 |
| 4,291,265 | 9/1981 | Kawada et al. | 318/782 |
| 4,314,191 | 2/1982 | Kawada et al. | 318/802 |
| 4,346,434 | 8/1982 | Morinaga | 364/183 |
| 4,390,826 | 6/1983 | Erdman et al. | 318/439 |
| 4,418,308 | 11/1983 | Bose | 318/803 |
| 4,459,519 | 7/1984 | Erdman | 318/254 |
| 4,477,762 | 10/1984 | Kurakake et al. | 318/802 |
| 4,495,450 | 1/1985 | Tokizaki et al. | 318/138 |
| 4,500,821 | 2/1985 | Bitting et al. | 318/254 |
| 4,507,724 | 3/1985 | Glennon | 363/98 |
| 4,520,296 | 5/1985 | Lepper et al. | 318/254 |
| 4,528,486 | 7/1985 | Flaig et al. | 318/254 |
| 4,540,921 | 9/1985 | Boyd, Jr. et al. | 318/254 |
| 4,558,264 | 12/1985 | Weischedel | 318/254 |
| 4,578,623 | 3/1986 | Tsukutani et al. | 318/254 |
| 4,595,865 | 6/1986 | Jahns | 318/254 |
| 4,617,622 | 10/1986 | Fox | 363/98 |
| 4,636,936 | 1/1987 | Boyd, Jr. et al. | 364/148 |
| 4,642,536 | 2/1987 | Boyd, Jr. et al. | 318/254 |
| 4,642,537 | 2/1987 | Young | 318/254 |
| 4,649,331 | 3/1987 | Jahns | 318/798 |
| 4,654,566 | 3/1987 | Erdman | 318/254 |
| 4,667,480 | 5/1987 | Bessler | 62/180 |
| 4,678,973 | 7/1987 | Elliott et al. | 318/254 |
| 4,706,177 | 11/1987 | Josephson | 363/24 |
| 4,712,050 | 12/1987 | Nagasawa et al. | 318/254 |
| 4,743,815 | 5/1988 | Gee et al. | 318/254 |

(List continued on next page.)

FOREIGN PATENT DOCUMENTS

| | | |
|---|---|---|
| B-8993991 | 6/1995 | Australia . |
| 87/03 433 | 4/1987 | WIPO ............................. H02P 6/02 |

OTHER PUBLICATIONS

Thomas M. Jahns et al., "Integrated Current Regulation for a Brushless ECM Drive," Jan. 1991, IEEE Transactions On Power Electronics, vol. 6, No. 1, pp. 118–126.

*Primary Examiner*—Jeffrey A. Gaffin
*Assistant Examiner*—Michael Sherry
*Attorney, Agent, or Firm*—Enrique J. Mora

[57] ABSTRACT

A system for controlling circulating currents in a motor. A power supply link having upper and lower rails supplied by a power supply provides power to the motor windings. The power supply link also has power switches responsive to a motor control signal for selectively connecting the rails to the windings in alternating on and off intervals. The system includes a first resistive shunt in the upper rail of the power supply link between the power supply and the power switches and a second resistive shunt in the lower rail of the power supply link between the power supply and the power switches. The power supply link routes current circulating in the power supply link and windings through either the first or second resistive shunt for continuously sensing current in the rails. The system also includes a current regulation circuit which generates an overcurrent signal as a function of the current sensed in either the first or second resistive shunt exceeding a maximum current level. A control circuit responsive to the overcurrent signal causes each of the power switches to become nonconducting thereby to prevent excessive current from circulating in the motor.

27 Claims, 12 Drawing Sheets

U.S. PATENT DOCUMENTS

| | | | |
|---|---|---|---|
| 4,752,724 | 6/1988 | Radziwill et al. | 318/254 |
| 4,757,241 | 7/1988 | Young | 318/254 |
| 4,757,603 | 7/1988 | Stokes | 29/598 |
| 4,763,347 | 8/1988 | Erdman | 318/254 |
| 4,806,839 | 2/1989 | Nagato et al. | 318/798 |
| 4,879,502 | 11/1989 | Endo et al. | 318/723 |
| 4,952,853 | 8/1990 | Archer | 318/254 |
| 4,958,269 | 9/1990 | Gritter | 364/153 |
| 5,045,988 | 9/1991 | Gritter et al. | 363/35 |
| 5,107,685 | 4/1992 | Kobayashi | 62/115 |
| 5,119,071 | 6/1992 | Takezawa et al. | 318/130 |
| 5,123,746 | 6/1992 | Okado | 363/37 |
| 5,172,036 | 12/1992 | Cameron | 318/138 |
| 5,221,881 | 6/1993 | Cameron | 318/254 |
| 5,233,275 | 8/1993 | Danino | 318/254 |
| 5,254,926 | 10/1993 | Miller et al. | 318/798 |
| 5,285,029 | 2/1994 | Araki | 187/114 |
| 5,306,988 | 4/1994 | Carobolante et al. | 318/254 |
| 5,423,192 | 6/1995 | Young et al. | 62/228 |
| 5,506,487 | 4/1996 | Young et al. | 318/811 |
| 5,552,685 | 9/1996 | Young et al. | 318/254 |

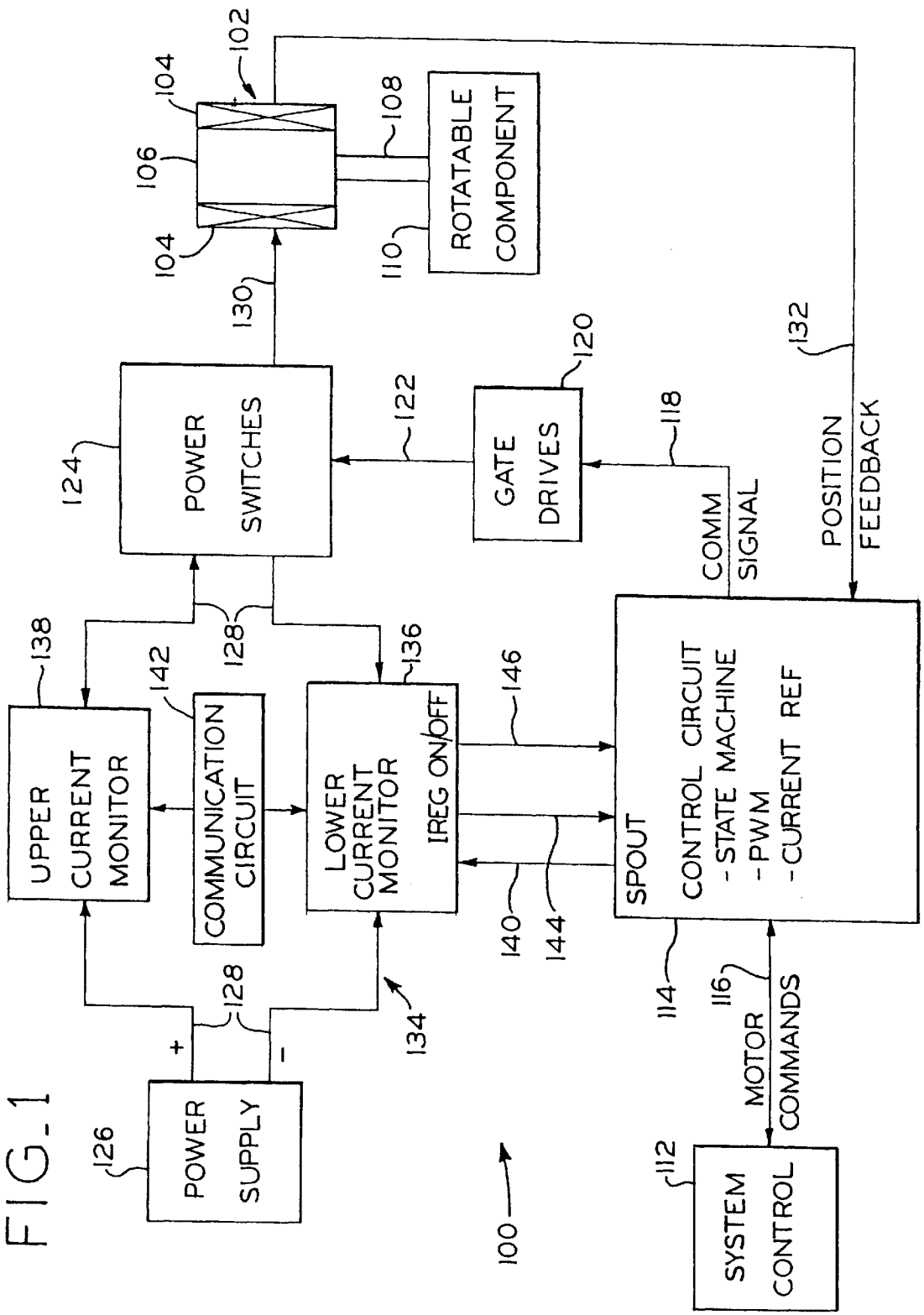
FIG_1

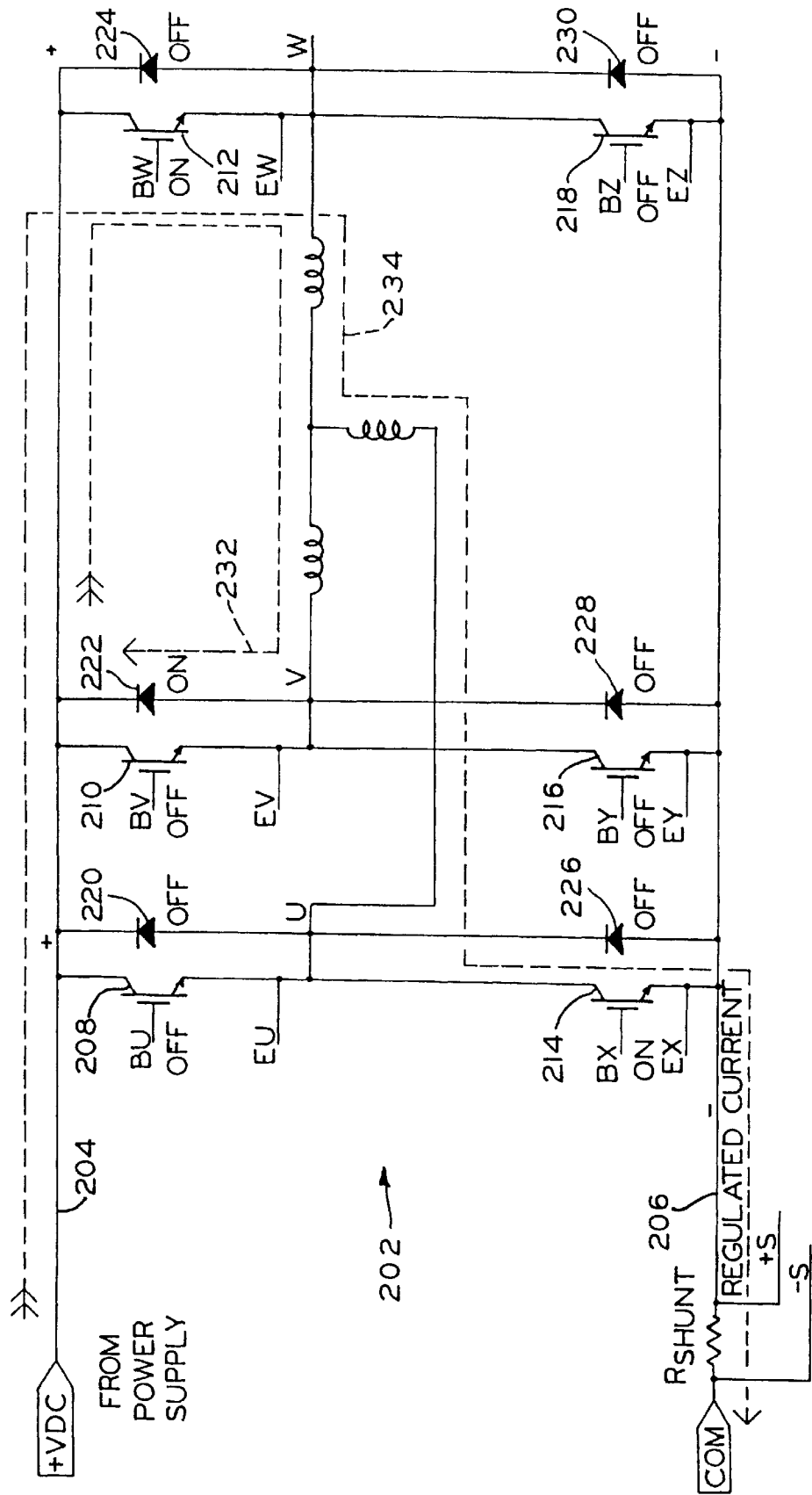
FIG_2 PRIOR ART

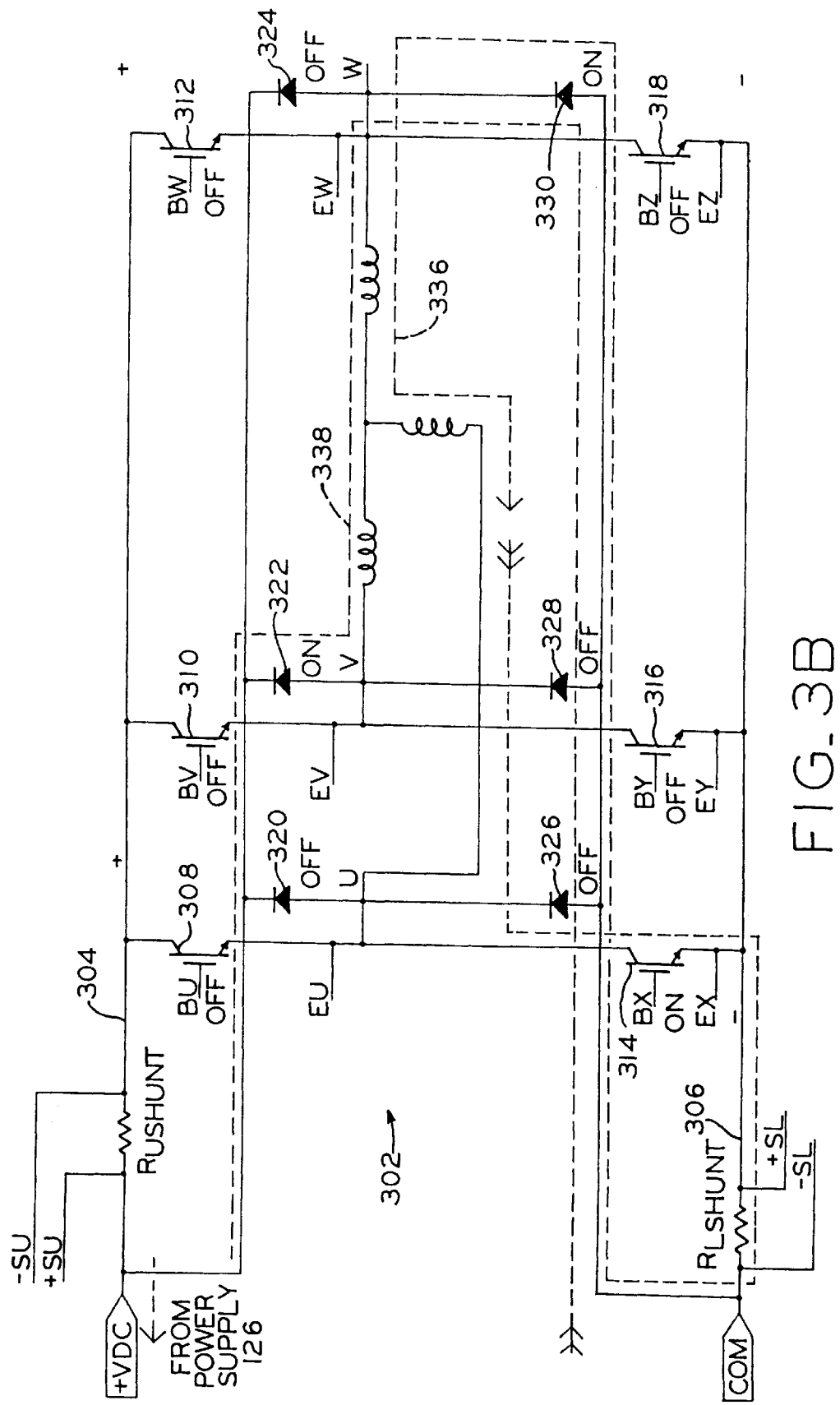
FIG_3B

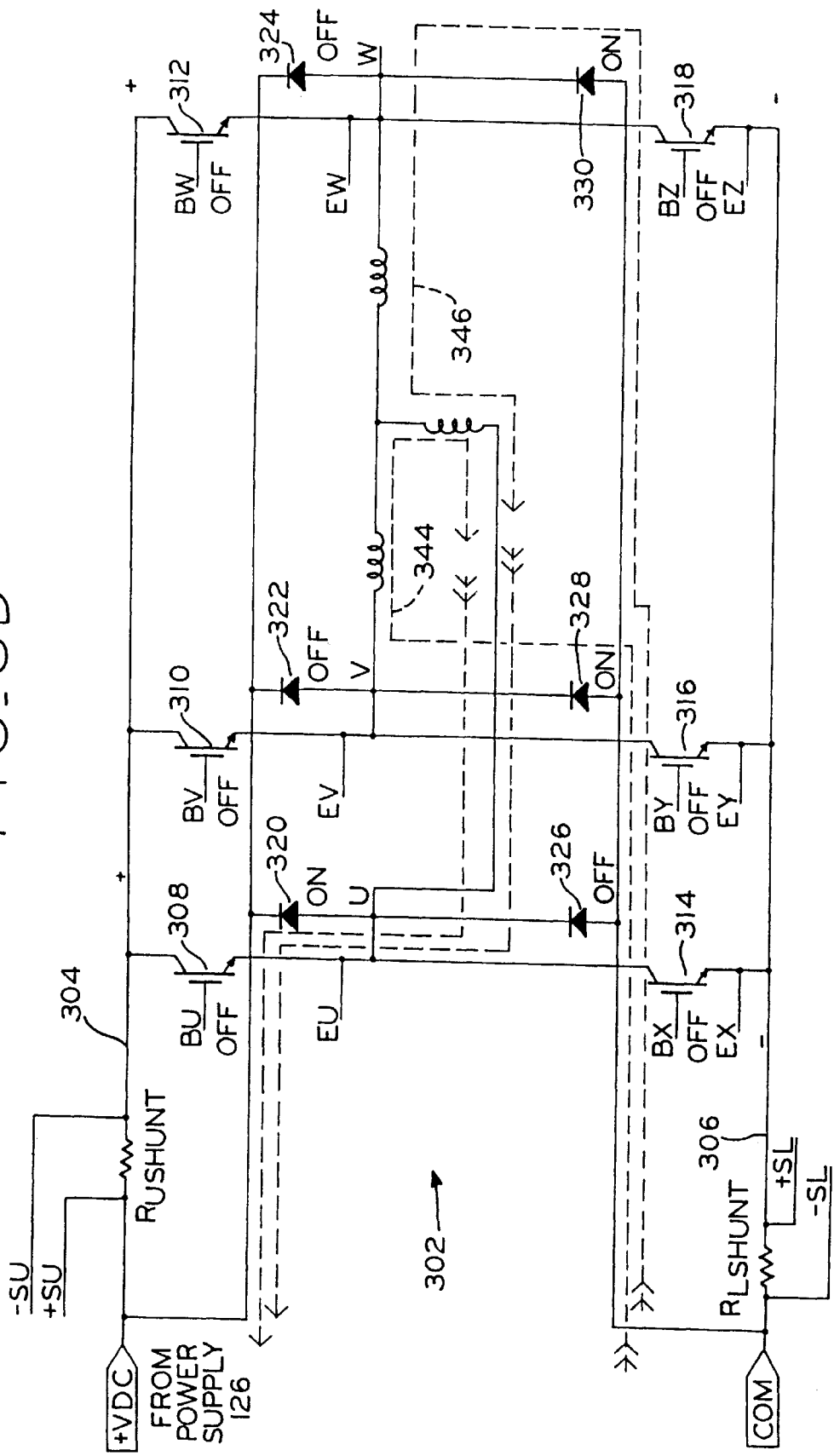
FIG._3D

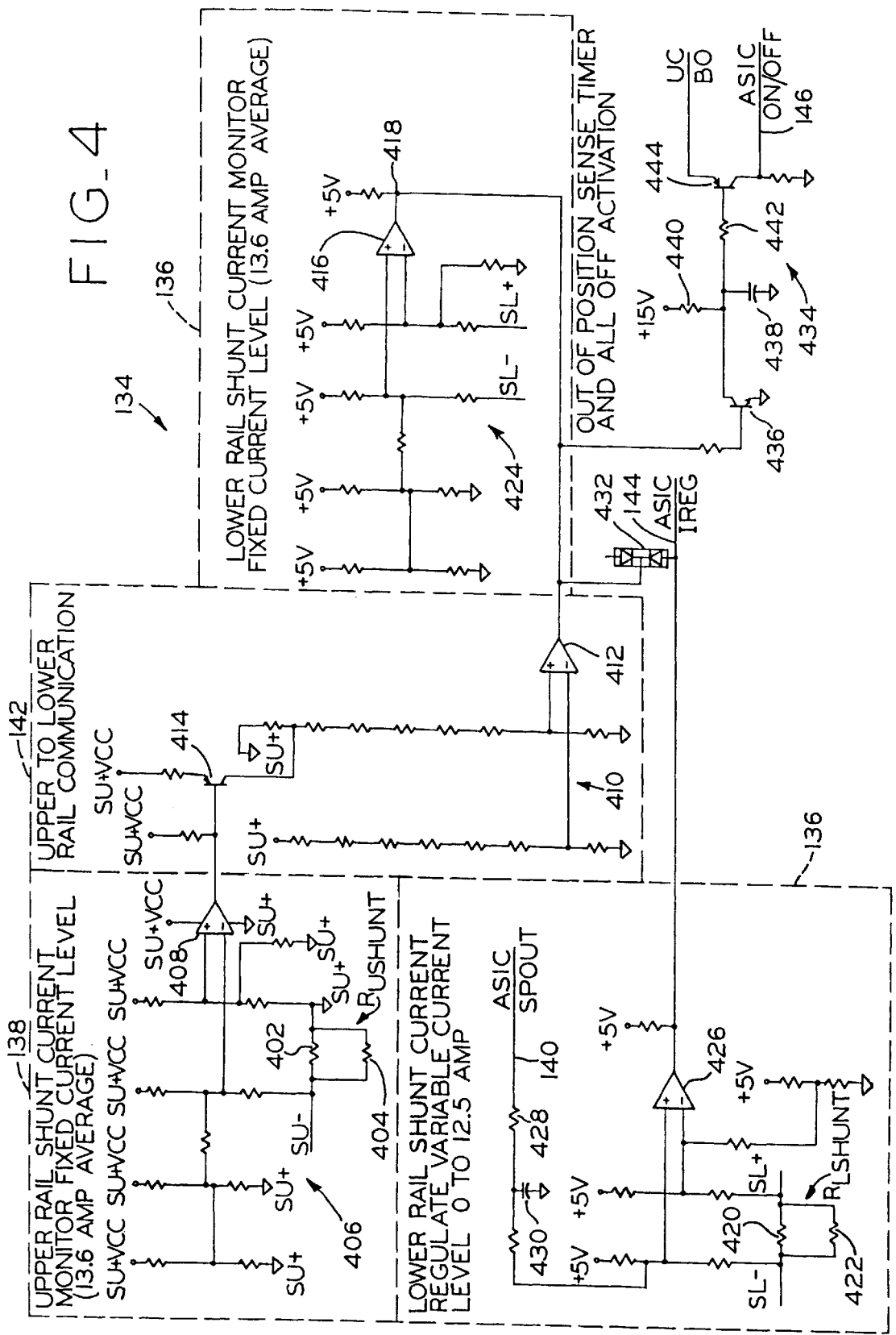

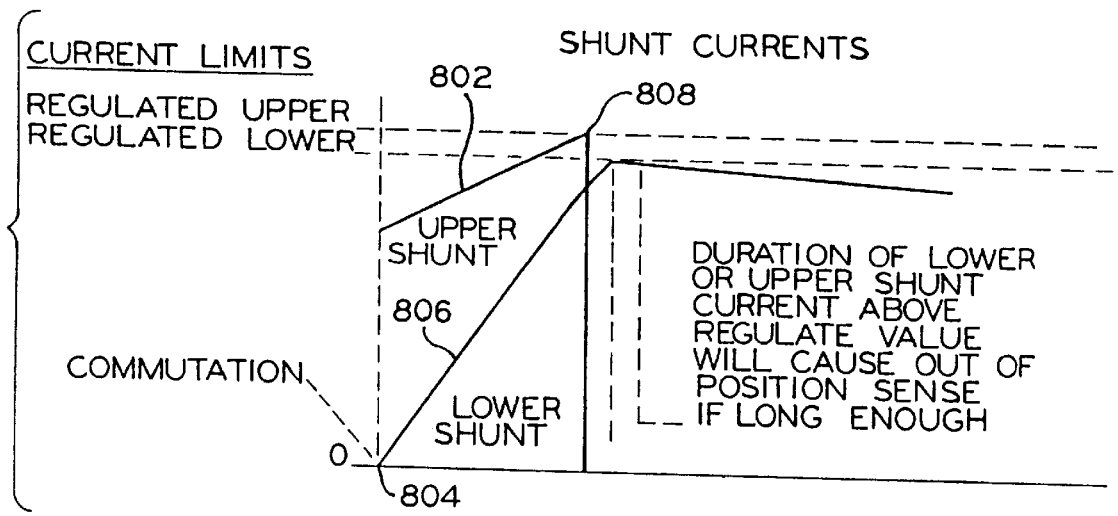
FIG_8A
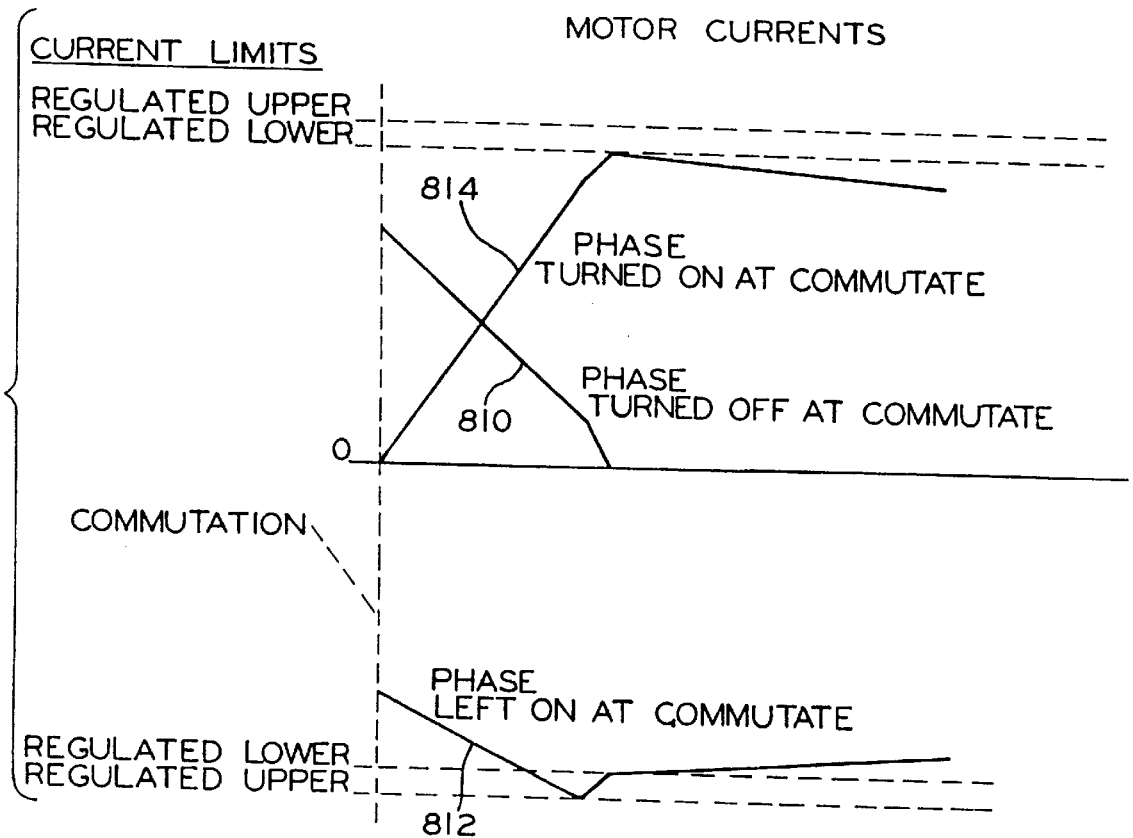
FIG_8B

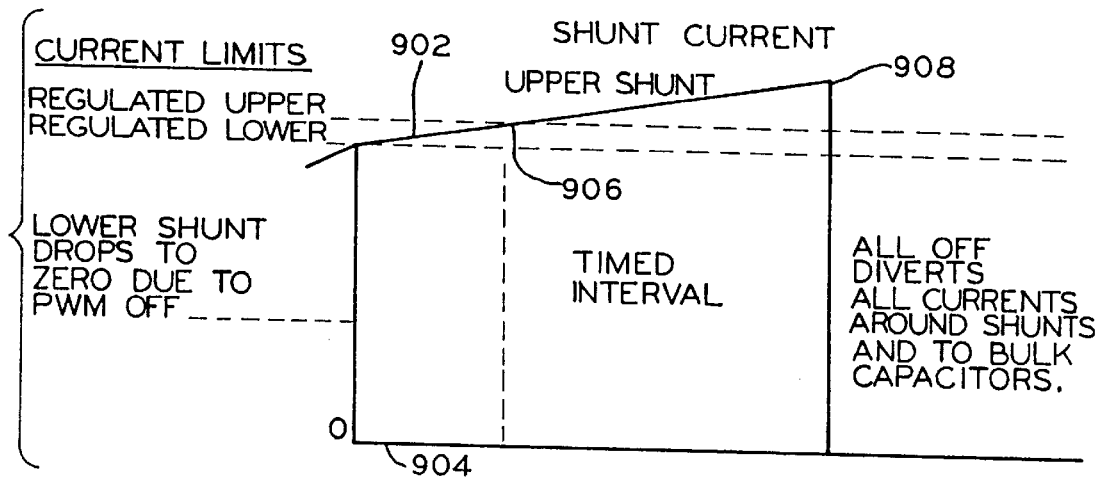
FIG_9A
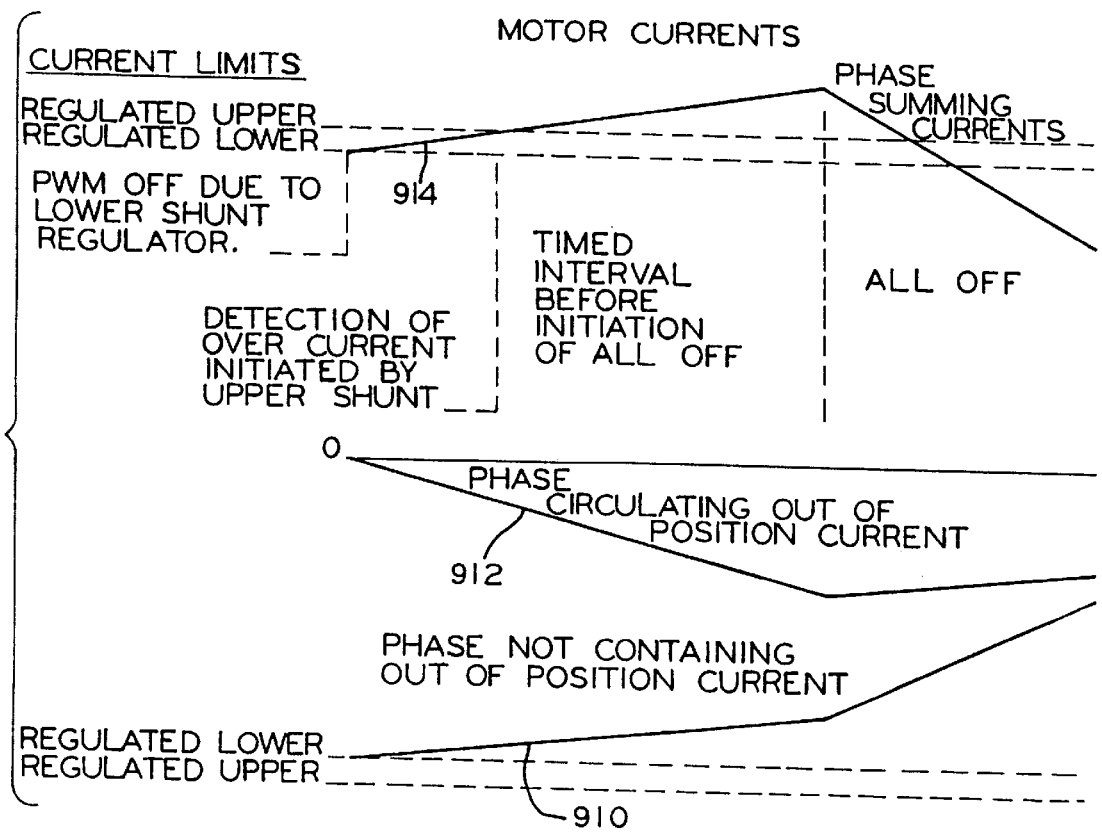
FIG_9B

SYSTEM AND METHOD FOR DETECTION AND CONTROL OF CIRCULATING CURRENTS IN A MOTOR

BACKGROUND OF THE INVENTION

This invention generally relates to an improved motor system for controlling circulating currents in a motor and, particularly, to an electronically controllable motor having a current regulation circuit for continuously detecting and controlling circulating currents in the motor.

A motor system according to the present invention typically includes a brushless DC motor having an inverter bridge for driving the motor. The inverter bridge has a number of power switching devices with a flyback diode coupled to each of the devices and forms part of a power supply link for connecting the motor's windings to a power supply. The power supply link has positive and negative rails connected to the power supply. Generally, two windings of a three phase motor are energized at a time and the power is pulse width modulated for control purposes. Such a motor system provides pulse width modulation (PWM) of the power to the windings by turning on and off at least one of the power switching devices. Under a normal PWM control scheme, the motor system turns off one device at a time which causes a flyback current to circulate in the inverter bridge. Such circulating currents result from energy stored in the phase winding inductances and flow through one power device and one diode in the inverter bridge. In normal operation, circulating currents decay rapidly because the motor back electromotive force (EMF) opposes their flow. In abnormal operation, however, the back EMF causes circulating currents to increase rather than to decay because the enabled power switches and the polarity of the back EMF are not in synchronism. This can result in damage to the current-carrying power devices as well as to the motor's permanent magnets. A momentary reversal of rotation at start-up or a failure to properly sense rotor position are examples of abnormal operating conditions which cause increasing circulating currents.

Generally, current sensors are required in all phases of a motor to determine what currents are in the motor. The costs associated with isolated current sensors (e.g., current transformers or Hall-effect sensors) as well as integrated current sensors, however, are often prohibitive of their use in many applications. The use of a shunt current sensing element located in one of the DC power buses that supplies an inverter is also known. Although less expensive, the conventional use of such a shunt has several disadvantages. Primarily, systems that employ shunt current sensing elements cannot detect abnormal circulating currents in the inverter switches, rectifiers and motor phases because such currents do not flow in and, thus, cannot be observed in conventional shunt current sensors.

One technique for detecting circulating currents that employs a shunt on the negative DC bus is to pulse width modulate the enabled power switching devices (upper and lower) simultaneously. As such, current is detectable at the shunt during the PWM off intervals and may be compared to a reference level. Disadvantageously, this technique results in excessive switching losses in the power devices, especially for motors having power ratings in the integral horsepower range. Another technique is to periodically open all power switching devices simultaneously while the motor is operating. This technique, however, undesirably reduces torque production.

Commonly assigned U.S. Pat. No. 5,552,685, the entire disclosure of which is incorporated herein by reference, shows a motor system which permits the use of a single current sensing element in the power supply link while still providing detection and control of abnormal circulating currents in the motor and inverter bridge. Advantageously, the system of the 5,552,685 patent provides overcurrent protection from abnormal circulating currents without having continuous knowledge of the motor winding currents.

Although such a system provides improved control of circulating currents and a reduction in current that develops during loss of position, further improvements are still desired, particularly at low speeds. At low speeds, circulating current is likely to remain in two of the three phase windings for a time after motor operation is interrupted in response to excessive currents being detected in the shunt. A single shunt in the DC rail, however, is unable to continuously monitor circulating currents in the motor windings. Therefore, once commutation resumes, circulating current that is still present in two of the three windings will not appear in the shunt while the rail current is being built up in the third winding. As a result, excessive currents may rapidly develop in the motor yet go undetected. Further, where precise control of currents resulting from a loss of position is required to prevent demagnetization, the summed effect of the circulating currents must be monitored to limit the current to within, for example, 30% of the maximum operating current. A single resistive shunt in the DC rail is unable to detect and continuously monitor the summed effect of the circulating and regulated currents.

For these reasons, a relatively inexpensive means for detecting and controlling circulating currents in the motor is needed that does not cause excessive power losses or loss of torque production but which provides continuous current monitoring and prevents false overcurrent trippings.

Brushless DC motors are disclosed in, for example, U.S. Pat. Nos. 5,552,685, 5,423,192 and 4,757,241, all of which are commonly assigned with the present application and the entire disclosures of which are incorporated herein by reference.

SUMMARY OF THE INVENTION

Among the several objects of this invention may be noted the provision of an improved motor system which permits detection and control of abnormal circulating currents in a motor; the provision of such a motor system which reduces the incidence of false indications of abnormal circulating currents; the provision of such a motor system which permits continuous monitoring of motor winding currents; and the provision of such a motor system which is economically feasible and commercially practical.

Briefly described, a motor system embodying aspects of the present invention includes a stationary assembly with windings and a rotatable assembly in magnetic coupling relation to the stationary assembly. A power supply link having upper and lower rails supplied by a power supply provides power to the windings. The power supply link also has power switches responsive to a motor control signal for selectively connecting the rails to the windings in alternating on and off intervals to produce an electromagnetic field for rotating the rotatable assembly. Current circulating in the power supply link and windings is routed through a current sensing circuit for sensing current in each of the rails of the power supply link during both the on and off intervals of the power provided to the windings. The system also includes a current regulation circuit for generating an overcurrent signal as a function of the current sensed in either one of the rails exceeding a maximum current level. A control circuit responsive to the overcurrent signal then causes each of the power switches to become nonconducting thereby to prevent excessive current from circulating in the motor system.

In another form, a motor system embodying aspects of the invention includes a stationary assembly with windings and a rotatable assembly in magnetic coupling relation to the stationary assembly. A power supply link having upper and lower rails supplied by a power supply provides power to the windings. The power supply link also has power switches responsive to a motor control signal for selectively connecting the rails to the windings to produce an electromagnetic field for rotating the rotatable assembly. Current circulating in the power supply link and windings is routed through either a first resistive shunt or a second resistive shunt. The first resistive shunt is in the upper rail of the power supply link between the power supply and the power switches for sensing current in the upper rail and the second resistive shunt is in the lower rail of the power supply link between the power supply and the power switches for sensing current in the upper rail. The system also includes a current regulation circuit for generating an overcurrent signal as a function of the current sensed in either one of the resistive shunts exceeding a maximum current level. A control circuit responsive to the overcurrent signal then causes each of the power switches to become nonconducting thereby to prevent excessive current from circulating in the motor system.

In another form, the invention is directed to a system for driving a rotatable component. The system includes a motor having stationary assembly with windings and a rotatable assembly in magnetic coupling relation to the stationary assembly. The rotatable assembly is in driving relation with the rotatable component. A power supply link having upper and lower rails supplied by a power supply provides power to the windings. The power supply link also has power switches responsive to a motor control signal for selectively connecting the rails to the windings in alternating on and off intervals to produce an electromagnetic field for rotating the rotatable assembly. Current circulating in the power supply link and windings is routed through a current sensing circuit for sensing current in each of the rails of the power supply link during both the on and off intervals of the power provided to the windings. The system also includes a current regulation circuit for generating an overcurrent signal as a function of the current sensed in either one of the rails exceeding a maximum current level. A control circuit responsive to the overcurrent signal then causes each of the power switches to become nonconducting thereby to prevent excessive current from circulating in the motor system.

A protective circuit for a motor that embodies aspects of the invention includes a current sensing circuit for sensing current in each of the rails of a power supply link during both the on and off intervals of the power provided to the windings of the motor. A circuit routes current circulating in the power supply link and windings through the current sensing circuit. The protective circuit also includes a current regulation circuit for generating an overcurrent signal as a function of the current sensed in either one of the rails exceeding a maximum current level. A motor control circuit is responsive to the overcurrent signal for causing each of the power switches to become nonconducting thereby to prevent excessive current from circulating in the motor.

In another form, the invention is directed to a method of controlling circulating currents in a motor. The motor has a stationary assembly with windings and a rotatable assembly in magnetic coupling relation to the stationary assembly. The motor also has a power supply link for providing power to the windings. The power supply link includes upper and lower rails supplied by a power supply and power switches. The method includes the step of selectively connecting the rails to the windings in alternating on and off intervals with the power switches to produce an electromagnetic field for rotating the rotatable assembly. The power switches are responsive to a motor control signal. The method also includes routing current circulating in the power supply link and windings through a current sensing circuit and sensing current with the current sensing circuit in each of the rails of the power supply link during both the on and off intervals of the power provided to the windings. The method further includes generating an overcurrent signal as a function of the current sensed in either one of the rails exceeding a maximum current level and generating the motor control signal as a function of the overcurrent signal for causing each of the power switches to become nonconducting thereby to prevent excessive current from circulating in the motor.

Alternatively, the invention may comprise various other systems and methods.

Other objects and features will be in part apparent and in part pointed out hereinafter.

BRIEF DESCRIPTION OF THE DRAWINGS

FIG. 1 is a block diagram of a preferred embodiment of a motor drive system including upper and lower current monitors and a control circuit according to the invention.

FIG. 2 is a schematic diagram of a known inverter bridge for driving a motor and illustrates currents in the inverter bridge after loss of position.

FIGS. 3A–3D are schematic diagrams of an inverter bridge according to the invention for driving the motor of FIG. 1 and illustrate controlled currents in the inverter bridge.

FIG. 4 is a schematic diagram of the upper and lower current monitors of FIG. 1 according to the invention.

FIGS. 8A and 8B are exemplary timing diagrams illustrating the relationship between motor and shunt currents at low speed commutation for the upper and lower current monitors of FIG. 7.

FIGS. 9A and 9B are exemplary timing diagrams illustrating the relationship between motor and shunt currents at loss of position for the upper and lower current monitors of FIG. 7.

Corresponding reference characters indicate corresponding parts throughout the drawings.

DETAILED DESCRIPTION OF PREFERRED EMBODIMENTS

Figure 3A:
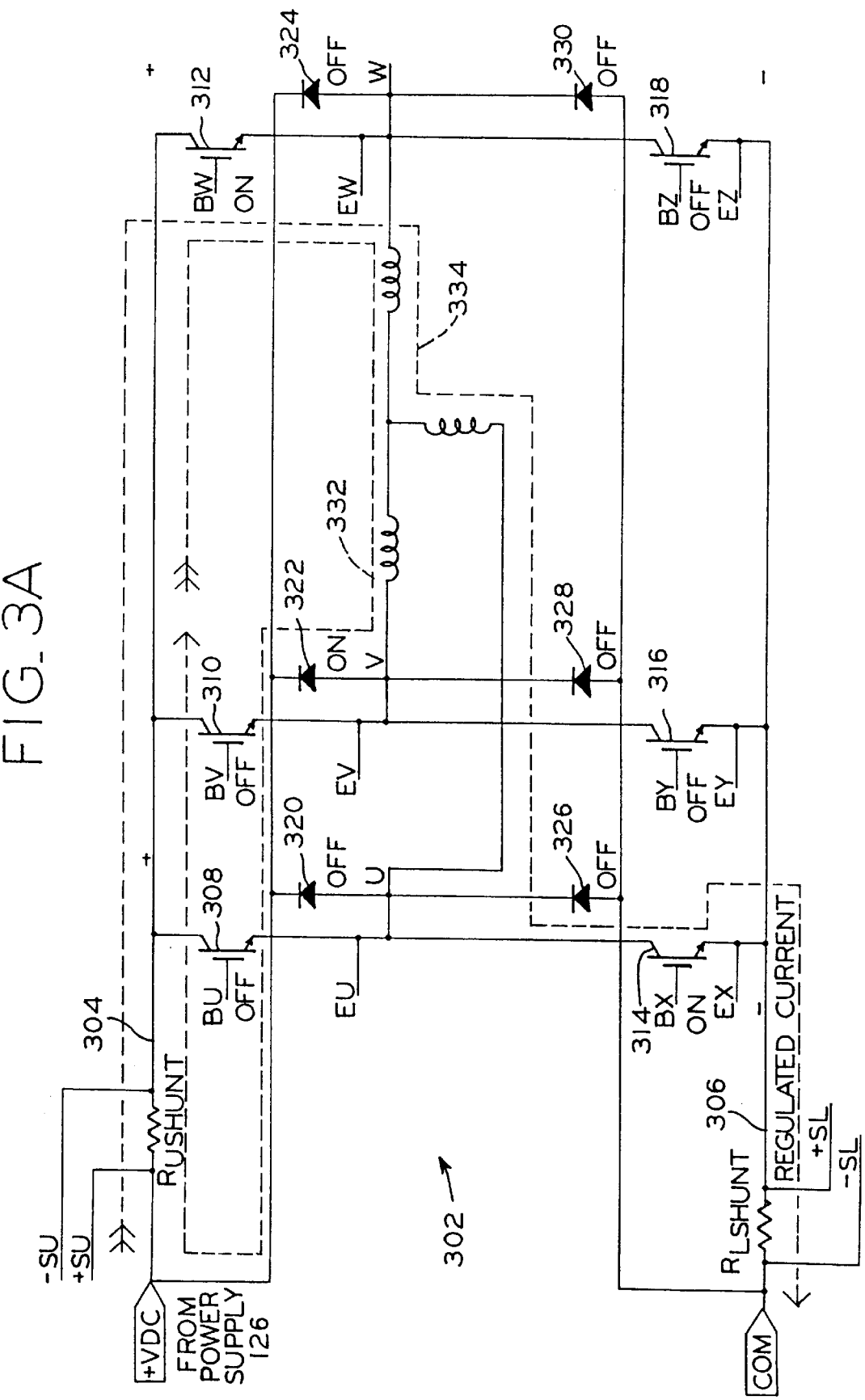

Referring now to the drawings, FIG. 1 shows a motor system 100 according to a preferred embodiment of the present invention. The system 100 includes a motor, generally designated 102, having a stationary assembly, or stator, 104 and a rotatable assembly, or rotor, 106 in magnetic coupling relation to the stator 104. In the embodiment described herein, motor 102 is a three phase, electronically commutated motor. It is to be understood, however, that motor 102 may be any electronically controllable motor or dynamoelectric machine typically powered by an electronic control circuit. Such motors include, for example, external rotor motors (i.e., inside out motors), permanent magnet motors, single and variable speed motors, selectable speed motors having a plurality of speeds, brushless dc motors, electronically commutated motors, switched reluctance motors and induction motors. In addition, the motors may be multi-phase or single phase motors and, in any case, such motors may have a single split phase winding or a multi-phase winding. Such motors may also provide one or more finite, discrete rotor speeds selected by an electrical switch or other control circuit.

In a preferred embodiment of the invention, a motor shaft 108 mechanically connects the rotor 106 to a particular device to be driven, such as a rotatable component 110. For example, rotatable component 110 comprises a compressor or fan directly coupled to the shaft 108. In the alternative, rotatable component 110 includes a connection mechanism (not shown) for coupling rotatable component 110 to shaft 108.

System 100 preferably includes a user interface, or system control, 112 for providing system control signals in the form of motor commands to a control circuit 114 via line 116. For example, if system 100 is a compressor drive system, the system control 112 may be a controller which provides temperature signals, refrigeration demand signals and the like. As represented by the block diagram of FIG. 1, the control circuit 114 provides a motor control, or commutation, signal via line 118 in the form of gate drive signals for electronically controlling a plurality of gate drives 120. In turn, the gate drives 120 provide drive signals via line 122 for switching a plurality of power switches 124, such as IGBT's, BJT's or MOSFET's. In addition to providing drive signals shifted from, for example, 5 volts to 15 volts for driving the power switches 124, gate drives 120 also condition the signals provided by control circuit 114 via line 118 for optimal operation of power switches 124.

As shown in FIG. 1, a power supply 126 provides high voltage DC power via lines 128 to power switches 124. In turn, power switches 124 provide power via line 130 to motor 102. By selectively switching the power supply 126 in connection with the windings included in stator 104 (see FIGS. 3A–3D), power switches 124 energize the motor windings in at least one preselected sequence for commutating motor 102 in response to control circuit 114. As such, lines 128 and 130 in combination with power switches 124 constitute a power supply link for connecting power supply 126 to motor 102. It is to be understood that power supply 126 may also provide power to operate control circuit 114 which drives power switches 124 by gate drives 120. In this instance, power switches 124, driven by gate drives 120, control rotation in motor 102 as a function of the commutation signal. As described below, lines 128 connect power switches 124 to power supply 126 in such a way that current circulating in the power supply link and windings is routed through either upper rail current monitor 138 or lower rail current monitor 136.

Referring further to FIG. 1, control circuit 114 receives signals representative of the position of rotor 106 via line 132 from motor 102. According to a preferred embodiment of the invention, control circuit 114 receives position feedback as a function of back electromotive force (EMF) in the motor windings. Other position sensors, such as Hall sensors or optical sensors, may also be used to provide feedback concerning the position of rotor 106 instead of or in addition to the back EMF information. Preferably, the rotor position feedback signal is at a predefined angular relationship from the motor back EMF.

Control circuit 114 preferably determines the position of rotor 106 as a function of the zero crossings of the back EMF and generates commutation signals in response thereto. Torque production in motor 102 is then determined by the product of the current and the back EMF. In order to sustain positive torque, it is necessary to energize the windings when the back EMF has crossed zero in the direction that will oppose the voltage energizing it. Since it is desired that motor current crosses zero at the time the motor back EMF also crosses zero, control circuit 114 preferably commutates motor 102 at an angle relative to the back EMF zero crossing. At low speeds, for example, it is convenient to energize a winding of stator 104 when it is experiencing maximum rotor flux. In other words, control circuit 114 controls commutation as a function of the elapsed time between commutations and zero crossings of the back EMF waveform and generates gate drive signals at line 118 for driving power switches 124 in response to the position sensing.

In a preferred embodiment, each of the commutation pulses of the commutation signal corresponds to a zero crossing. As described below, the power supply link energizes two of the three windings of motor 102 at any given time during operation for developing torque. Control circuit 114 selects the unenergized winding for position sensing by observing the motor phase back EMF waveforms when current in the selected phase has decayed to zero. A back EMF sensing network (not shown) detects the zero crossings of the difference between the back EMF of the selected winding of stator 104 as compared to a reference level. The reference level is, for example, the sum of the voltages of the energized windings.

Commonly assigned U.S. Pat. No. 5,423,192, the entire disclosure of which is incorporated herein by reference, describes one preferred means for detecting zero crossings.

Preferably, control circuit 114 is part of an application specific integrated circuit (ASIC) or universal electronically commutated motor integrated circuit (UECM IC). In response to the system control signals, control circuit 114 generates motor control, or commutation, signals via line 118. The commutation signals cause system 100 to produce a peak current that matches the load torque demand as a function of a peak regulated current reference signal SPOUT. Matching torque load with produced torque causes motor 102 to operate at a desired torque or speed. The commutation signals preferably include a series of pulse width modulated cycles, wherein each cycle causes a corresponding switching event of power switches 124. The motor windings are adapted to be commutated in at least one preselected sequence and power switches 124 selectively provide power to the windings in the preselected sequence. Current in the windings produces an electromagnetic field for rotating the rotor 106 of motor 102. To control the speed of component 106, system 100 preferably controls the speed of motor 102 by controlling the power delivered to the load. In particular, system 100 regulates current in motor 102, which in turn regulates torque, to obtain the desired motor speed by matching the load and motor loss demand torque at the desired speed. In the alternative, control circuit 114 may be embodied by a microprocessor or microcontroller.

Figure 7:
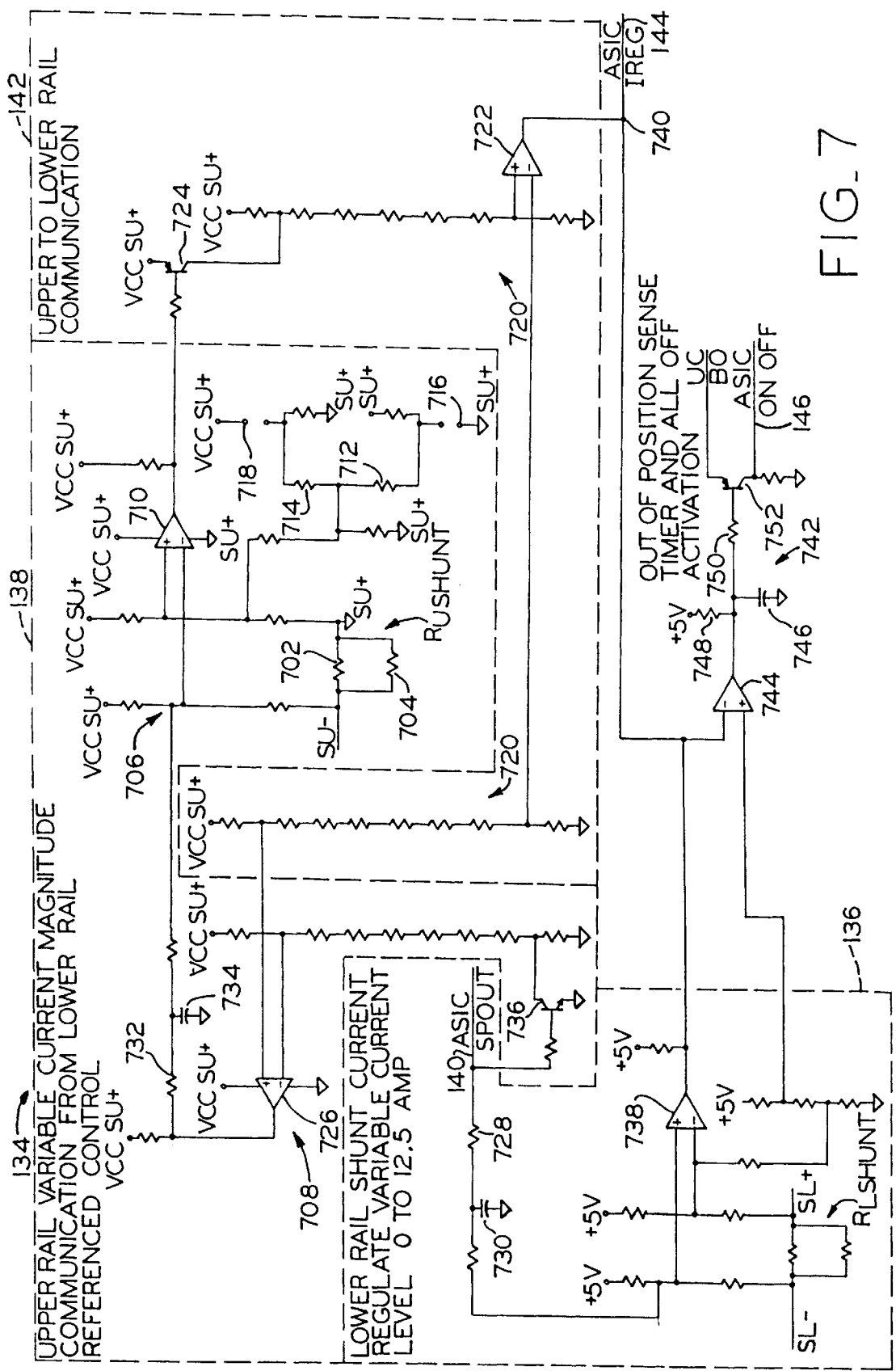
FIG. 7 is an alternative schematic diagram of the upper and lower current monitors of FIG. 1 according to the invention.

Referring further to FIG. 1, system 100 also includes a current regulation circuit, generally indicated 134, comprising a lower current monitor 136 and an upper current monitor 138 (shown in detail in FIGS. 4 and 7). Control circuit 114 cooperates with the current regulation circuit 134 to regulate current in system 100 and to control circulating currents in motor 102 during intervals when only one of the power switches 124 is conducting, when commutation occurs at relatively low speeds and when commutation occurs out of synchronization with the position of rotor 106.

According to one preferred embodiment of the invention, control circuit 114 determines the peak regulated current reference level and communicates the determined reference (i.e., the SPOUT signal) to current regulation circuit 134 via line 140. In one embodiment, the SPOUT signal is a pulse width modulated signal having a variable duty cycle representative of the desired current reference. For example, the duty cycle of may vary from 0% to 100% where 100% corresponds to a maximum regulated current value and the duty cycle is proportional to the desired current in motor 102. In the alternative, control circuit 114 generates a variable voltage signal, the magnitude of which represents the desired current. Other suitable means for providing the peak regulated current level include a simple resistor circuit or potentiometer.

As shown in FIG. 1, the lower current monitor 136 communicates with the upper current monitor 138 via a communication circuit 142. At a given instant in time, one of lower current monitor 136 and upper current monitor 138 senses current in the power supply link and compares the sensed current to the peak regulated current level represented by SPOUT. Current regulation circuit 134 then generates a current regulation signal IREG as a function of the comparison. In a preferred embodiment, the signal IREG is representative of alternating on and off intervals of power provided to the windings of motor 102 for regulating current at the peak regulated current level. Control circuit 114 receives the signal IREG via line 144 from current regulation circuit 134 for regulating current in motor 102. A pulse width modulation (PWM) state machine, shown in FIG. 1 as part of control circuit 114, generates switch commands as a function of IREG to effect current regulation in system 100. In this manner, system 100 controls the speed and/or torque of motor 102 as a function of the current regulation signal IREG. In the alternative, it is contemplated that system 100 may implement a voltage regulated control strategy rather than a current regulated one. Current regulation circuit 134 further communicates an ON/OFF signal to control circuit 114 via line 146. In the event of unacceptable levels of circulating current in the power supply link, current regulation circuit 134 uses the ON/OFF signal to instruct control circuit 114 to disable power switches 124 thereby controlling the circulating currents.

FIG. 2 illustrates a three-stage, full-bridge inverter 202 having a positive rail 204 and a negative rail 206 supplied by a power supply (not shown). The inverter bridge 202 also includes upper power switches 208, 210, 212 and lower power switches 214, 216, 218. Upper flyback diodes 220, 222, 224 and lower flyback diodes 226, 228, 230 are coupled in an anti-parallel relationship with the upper switches 208, 210, 212 and the lower power switches 214, 216, 218, respectively. Each phase U, V and W connects to the power supply through one of the upper switches 208, 210, 212 and one of the lower switches 214, 216, 218 for driving a motor. As shown in FIG. 2, power switches 208 and 214 correspond to phase U; power switches 210 and 216 correspond to phase V; and power switches 212 and 218 correspond to phase W.

One commutation strategy for a motor driven by inverter bridge 202 involves three-phase excitation with trapezoidal current excitation. Such a strategy commands two switches on during each motoring interval, i.e., one from upper switches 208, 210, 212 and one from lower switches 214, 216, 218, depending on rotor position. Thus, the power switches are activated in pairs and current flows in two of the three motor phases during each excitation interval.

Generally, due to motor back EMF and loop impedance, currents circulate in inverter bridge 202 when the motor phases are commutated and when a loss of position occurs such that the motor control and the rotor rotation are out of synchronization. For example, a loss of position may occur due to current remaining in the back EMF sensing winding overlapping the zero crossing. During an interval in which commutation occurs out of synchronization with the back EMF, the net voltage driving the motor current is the supply voltage plus the back EMF. Since the back EMF and the motor current have opposing polarities, the higher net voltage driving the motor windings causes motor current to build up faster than during normal operation.

One known technique for regulating the current in the windings is to pulse width modulate the power applied to the energized windings by turning on and off one of the active power switches. The motor back EMF and loop impedance also cause circulating currents when motor current is being regulated by pulse width modulating one power device at a time. This results in a flyback current circulating in inverter bridge 202 when only one of the power switches and one flyback diode are conducting.

Circulating currents also may occur when the motor is first started because the rotor position is in advance or behind the intended field rotation and, for example, the advancing field forces a momentary reversal in the rotor's rotation when it has started in a direction opposite to the field rotation. The back EMF is usually low enough during start-up that very large out-of-position currents are not generated.

In particular, FIG. 2 shows current flow after a loss of position or at commutation. As an example, a loop 232 illustrates a circulating current path for current remaining in the windings from the previous state at commutation (especially at speeds below approximately one-half no load speed) and/or for current resulting from an out-of-position condition. According to the example, a loop 234 illustrates the path of current from positive rail 204 to negative rail 206. In this instance, loops 232 and 234 overlap. If the sum of regulated current and circulating current exceeds a maximum regulated level when a out-of-position condition occurs or when the motor operates at speeds below approximately one-half no load speed, damage may result to the various components of inverter bridge 202 and/or the motor it is driving.

In normal operation, circulating currents decay rapidly because the motor back EMF opposes their flow. In abnormal operation, however, the back EMF causes the circulating currents to increase rather than to decay. Thus, damage to the current-carrying power devices as well as to the motor's permanent magnets can result if the circulating currents are not properly controlled. Although excessive circulating currents may be managed by using higher current ratings of the power switching devices and permanent magnets, often this is not economically feasible.

A shunt resistor, current transformer, Hall-effect current sensor, integrated current sensor or other sensor or circuit known in the art may be used to sense the winding or motoring current of the motor driven by inverter bridge 202. FIG. 2 illustrates a single resistive shunt $R_{SHUNT}$ in the negative rail 206 of inverter bridge 202. The motor current flows only through the shunt resistor $R_{SHUNT}$ when power is being exchanged from the power supply to the motor and vice versa. Although resistor $R_{SHUNT}$ may be used to sense motor current, it cannot directly detect circulating currents in inverter bridge 202 because it is part of an open circuit during intervals when only one of the power switches is conducting.

As an example of the operation of inverter bridge 202, the power supply energizes both the U phase and the W phase when upper switch 212 and lower switch 214 are in their conducting states. In this example, if a loss of position occurs when both switches 212 and 214 are conducting, current circulates in inverter bridge 202 in loop 232 through the conducting switch 212 and diode 222. Likewise, current remaining from the previous state at commutation circulates in this path. As FIG. 2 shows, the circulating current path at loss of position (i.e., loop 232) does not include $R_{SHUNT}$. Thus, the circulating current goes undetected. Due to the fact that the circulating current cannot be directly detected, the sum of the regulated current and the circulating current in the V and W phases and switch 212 may exceed the maximum regulated current level when the commutation is out of synchronization with the rotor position or when the motor is being commutated at speeds below approximately one-half no load speed. Similarly, when switch 212 turns off according to the pulse width modulation scheme, a flyback current circulates in inverter bridge 202 through the conducting switch 214 and diode 230.

Commonly assigned U.S. Pat. No. 5,506,487, the entire disclosure of which is incorporated herein by reference, discloses a compressor drive that employs three current transformers for monitoring the motor phase currents and that initiates an out-of-position response based on an interval of time for which the current exceeds the regulate value. Generally, if both the controlling transistors are turned off for a relatively short interval (e.g., on the order of a PWM off interval) in response to a loss of position, the resulting reduction in torque caused by nuisance activations of the out-of-position response may be acceptable. On the other hand, in small, low cost, electronically commutated motors, for example, it may be desirable to turn off the power devices for a relatively longer interval in response to the detection of a loss of position. In these situations, the reduction in torque resulting from turning off the power devices may become problematic if the incidence of nuisance activations is too high. In one embodiment, control circuit 114 provides for an off time in the range of 0.5 to 1 second, for example, when an out-of-position condition is detected. In this embodiment, an unacceptable reduction in torque results from nuisance out-of-position responses if the determination of a loss of position is not relatively precise. As will be described below, the present invention provides improved precision by substantially eliminating nuisance out-of-position responses caused by circulating currents at commutation.

Similarly, an out-of-position response triggered by the PWM transistor turning off during a given interval of time following turn on provides adequate protection against excessive circulating currents in certain situations. An example of such a situation is an electric automobile compressor drive application in which the demagnetization current as well as the maximum power device current is high relative to the operating current. Further, in other drive applications in which unconstrained abnormal circulating currents are less than the demagnetization current or maximum desired power device current, for example, protection against abnormal circulating currents may not be necessary. On the other hand, the present invention provides control of circulating currents where the prior art does not in situations in which either the ratio of demagnetization current to operating current or the maximum current tolerated by the power devices is low. For example, if the demagnetization current is approximately 17 amps and the operating current is approximately 12.5 amps, the ratio is 1.36. In a preferred embodiment, system 100 reduces the ratio to approximately 1.2 which accounts for the tolerance of the circuit components that would be used to initiate overcurrent protection and to regulate the operating current.

Commonly assigned U.S. Pat. No. 5,506,487 discloses a drive system including an "off at commutate" circuit which operates to inhibit switching events of the power switching devices in advance of the back EMF during periods when the field collapse voltage is present for operation of the motor below approximately one-half no load speed. As such, the off at commutate circuit initiates conduction of motor phase current when the field collapse voltage has substantially decayed to reduce the number of nuisance out-of-position responses at commutation. Although the off at commutate circuit provides improved results in reducing the number of nuisance out-of-position responses at commutation, the use of this circuit may result in an unacceptable loss of torque in certain applications (e.g., low torque motors) because the torque loss becomes progressively greater as motor speed increases. For example, a loss of torque is not observed at 5% of top no load speed but at 19% of top no load speed (i.e., the minimum oiling speed for a compressor according to one embodiment of the invention), a 5% torque loss results. Further to the example, the off at commutate circuit may result in a 22% loss of torque at 45% of top no load speed a 53% loss of torque at 70% of top no load speed. Nuisance out-of-position responses at commutation occur in such a drive system at speeds up to approximately 45% of the top no load speed with a 45 microsecond loss of position interval. As referred to herein, the loss of position interval is a pre-defined interval during which the current exceeds a threshold before an out-of-position response is initiated. Advantageously, the present invention provides protection against excessive circulating currents when the resulting 22% loss of torque at 45% top no load speed with a 45 microsecond loss of position interval is undesirable. As will be described below, current regulation circuit 134 accommodates the conflict of nuisance trip elimination and loss of torque by separating the current regulation function from the loss of position detection function.

FIGS. 3A–3D illustrates an improved three-stage, full-bridge inverter 302 according to the present invention. In the illustrated embodiment, the inverter bridge 302 has an upper, or positive, rail 304 and a lower, or negative, rail 306 supplied by power supply 126. In this instance, the positive rail 304 and the negative rail 306 constitute lines 128 shown in FIG. 1. Power switches 124 are also part of the inverter bridge 302 and include upper power switches 308, 310, 312 and lower power switches 314, 316, 318. Upper flyback diodes 320, 322, 324 and lower flyback diodes 326, 328, 330 are coupled in a modified anti-parallel relationship with the upper switches 308, 310, 312 and the lower power switches 314, 316, 318, respectively. The windings of motor 102, illustrated as inductors in FIGS. 3A–3D and designated phases U, V and W, connect to power supply 126 via rail 304 through one of the upper switches 308, 310, 312 and to power supply 126 via rail 306 through one of the lower switches 314, 316, 318. As shown in FIGS. 3A–3D, power switches 308 and 314 correspond to phase U; power switches 310 and 316 correspond to phase V; and power switches 312 and 318 correspond to phase W.

In a preferred three-phase excitation scheme, the commutation signal generated by control circuit 114 commands two switches on during each motoring interval, i.e., one from upper switches 308, 310, 312 and one from lower switches 314, 316, 318, depending on the position of rotor 106. Thus, power switches 124 are activated in pairs and current flows in two of the three motor phases during each excitation interval. Preferably, control circuit 114 regulates current in the windings by turning on and off one of the active power switches 124 to pulse width modulate the power applied to the energized windings. This results in a flyback current circulating in inverter bridge 302 when only one of the power switches 124 and one flyback diode are conducting.

As an example, commonly assigned U.S. Pat. No. 4,757,603, the entire disclosure of which is incorporated herein by reference, shows a PWM control of a motor.

FIGS. 3A–3D further illustrate a single resistive shunt $R_{USHUNT}$ in the positive rail 304 of inverter bridge 302 and a single resistive shunt $R_{LSHUNT}$ in the negative rail 306 of inverter bridge 302. As will be described below, the upper rail shunt $R_{USHUNT}$ is part of upper current monitor 138 and the lower rail shunt $R_{LSHUNT}$ is part of lower current monitor 136. As such, lower and upper current monitors 136, 138, including shunts $R_{USHUNT}$ and $R_{LSHUNT}$, constitute a current sensing circuit.

According to the invention, inverter bridge 302 re-routes the flyback diode currents through either $R_{USHUNT}$ or $R_{LSHUNT}$. The motor current flows through shunts $R_{LSHUNT}$ and $R_{USHUNT}$ when power is being exchanged from power supply 126 to motor 102 or being circulated by motor 102. Although shunt resistor $R_{SHUNT}$ of FIG. 2 may be used to sense motor current, it cannot directly detect circulating currents in inverter bridge 202 because it is part of an open circuit during intervals when only one of the power switches 124 is conducting. In contrast, inverter bridge 302 of FIGS. 3A–3D advantageously provides direct circulating current sensing in, for example, $R_{USHUNT}$. It is to be understood that a current transformer, Hall-effect current sensor, integrated current sensor or other sensor or circuit known in the art may be used to sense the winding or motoring current of motor 102 instead of a resistor without deviating from the invention described herein.

For normal motoring operation, the state machine of control circuit 114 causes a pair of switches 124 to be enabled during each commutation interval. As commanded by the commutation logic, one of the two switches performs pulse width modulation while the other remains in its on, or conducting, state for the entire commutation interval. The polarity of the motor back EMF during this interval is counter to the supply voltage so that the driving electromotive force for developing current in the motor windings is the supply voltage minus the generated back EMF. When a pair of switches (e.g., switches 312 and 314) is commanded on, current builds up to a regulated level. Upon reaching the regulated level, control circuit 114 turns off one of the switches (e.g., switch 312) for a short time interval. During this time interval, motor current decays in a circulating loop until the "off time" expires and another PWM cycle is initiated. The polarity of the motor back EMF prevents the increase of circulating current. Control circuit 114 preferably includes an off timer circuit (not shown) and regulates the current in motor 102 as a function of the peak regulated current level SPOUT by turning off power to the windings for a predefined amount of time based on, for example, a portion of a commutation interval. In other words, control circuit 114 regulates current in the motor windings by pulse width modulation. In one preferred embodiment, system 100 uses a constant "off time" scheme for regulating current. In the alternative, the "off time" may be made variable as a function of speed or the PWM period may be held constant.

During abnormal operating conditions resulting from, for example, a loss of synchronism with the actual position of rotor 106, switches 124 are no longer enabled with respect to rotor position. Because at least one of the inverter switches (e.g., switch 314, switch 316 or switch 318) is continuously enabled, stimulation by the back EMF causes circulating current. When two of the switches 124 are enabled, the supply voltage of power supply 126 then drives the motor current. Aided by the back EMF, motor current builds up quickly and exceeds the regulated level at which time one of the switches (e.g., switch 308, switch 310 or switch 312) is turned off. During this PWM off time interval, motor current continues to increase driven by the back EMF alone. At the expiration of the off time, both switches conduct and the actual motor current is diverted through shunt $R_{LSHUNT}$ to complete the PWM cycle while its magnitude continues to increase.

Either upper current monitor 138 or lower current monitor 136, depending on which of the power switches 124 are enabled, compares the current sensed in the power supply link to a current threshold. According to the invention, the current threshold may be fixed (see FIG. 4) or variable (see FIG. 7) as a function of the power limitations of power switches 124, control circuit 114 and/or motor 102. Current monitors 136, 138 directly sense the current in the power supply link and compare it to the current threshold to determine if an unacceptable level of circulating current is present in the link and windings of motor 102. If so, current regulation circuit 134 generates an overcurrent signal (e.g., in the form of the ON/OFF signal) to initiate an out-of-position response. In turn, control circuit 114 receives the overcurrent signal via line 146 and sets an ALL OFF state for disabling power switches 124 and preventing the motor windings from being energized by power supply 126. In this manner, system 100 prevents excessive currents in motor 102.

In a preferred embodiment of the invention, current regulation circuit 134 does not signal the existence of a loss of position, or an out-of-position condition, until the sensed current exceeds the threshold for a pre-defined loss of position interval. In the alternative, current regulation circuit 134 signals a loss of position in response to the value of sensed current being greater than a maximum regulate value. Further, as described above, control circuit 114 pulse width modulates the power provided to motor 102 in response to current regulation circuit 134. As a result, the length of the PWM on intervals is indicative of the current level in the windings. In yet another alternative embodiment, current regulation circuit 134 signals an out-of-position condition when the PWM transistor turns off during a predetermined interval of time following turn on (i.e., it turns off too rapidly). Commonly assigned U.S. Pat. No. 5,552,685 discloses detecting a loss of position based on how rapidly the PWM transistor turns off.

In particular, the circuit diagram of FIG. 3A shows the current in inverter bridge 302 and motor windings U, V and W at one instance in time after the occurrence of a loss of position or at commutation. As an example of the normal operation of inverter bridge 302, gate drives 128 drive power switches 124 to connect windings U and W to power supply 126 by causing upper switch 312 and lower switch 314 to be in their conducting states. Control circuit 114 further controls one of the active switches (e.g., upper switch 312) to pulse width modulate the power being applied to windings U and W. During each PWM on interval of switch 312, the net voltage driving the motor current is the supply voltage less the back EMF. Further, since the back EMF and the motor current have the same polarity, power flow is from power supply 126 to motor 102. On the other hand, if the enabled power switches and the polarity of the back EMF are out of synchronism due to a loss of position, current circulates in the inverter bridge 302 as shown in FIG. 3A. Likewise, current remaining in the windings from the previous commutation state also circulates in inverter bridge 302 at commutation.

As shown in FIG. 3A, the circulating currents flow in a loop 332 which includes switch 312, windings W and V, and diode 322. Such currents do not flow in rail 306 and, thus, a single shunt resistor, such as $R_{SHUNT}$ of FIG. 2, is unable to observe these circulating currents. A loop 334 illustrates the path of current from positive rail 304 to negative rail 306. According to the invention, however, inverter bridge 302 re-routes the flyback current so that upper shunt $R_{SHUNT}$ carries the sum of regulated motor current and circulating current. As a result, control circuit 114 can monitor the current in inverter bridge 302 and, thus, can control excessive currents to avoid damage to either motor 102 or the components of inverter bridge 302. In this manner, the present invention provides the ability to monitor and regulate circulating currents at every commutation which permits discrimination between out-of-position conditions and those conditions normally following commutation. This reduces the risk of nuisance activation of an out-of-position response.

FIG. 3B shows a circulating current path which exists when switch 312 is in an off, or nonconducting, state after commutation. According to the pulse width modulation scheme described above, control circuit 114 preferably causes one of the power switches 124 to be pulse width modulated (e.g., upper switch 312) for regulating motor current. However, this causes a flyback current to circulate in a loop 336 which includes the windings U and W, one of the flyback diodes (i.e., diode 330) and the conducting power switch (i.e., lower switch 314). In this instance, such currents do not flow in rail 304 and are not detectable in upper shunt $R_{USHUNT}$. The re-routed flyback diode current does, however, flow through lower shunt $R_{LSHUNT}$ of the negative DC supply rail 306 after commutation and after the PWM transistor (i.e., switch 312) turns off. In this instance, the circulating current that had remained from the previous commutation and that had been present in upper shunt $R_{USHUNT}$ is no longer in either the lower or upper shunt. Rather, this current is directly charging the bulk capacitor (not shown) of power supply 126.

The bulk rail voltage opposes the current remaining from the previous state at commutation which in turn induces winding voltages that force an increase in the current monitored by lower current monitor 136 even though switch 312 is off and the back EMF of the windings are in basic opposition. In other words, the circulating current in a loop 338 remaining from the previous state at commutation is forced against the full rail voltage but adds to the current in loop 336. This causes the circulating current to decay more rapidly but causes the monitored or regulated current to increase. The regulated current continues to increase until the circulating current in loop 338 decays to zero. This increase is particularly seen when the speed of motor 102 is less than approximately half of the top no load speed.

Further, since the winding which was turned on at commutation does not achieve full back EMF magnitude until 20° electrical, for example, the problem of excessive circulating currents is complicated when commutation occurs with a delay angle of less than approximately 15° electrical. In some applications, the commutation delay angle is made small (e.g., 5.6° to 7.5°) to achieve a desired operating torque. This develops from the need to force winding current at commutation to zero before the back EMF crosses zero voltage in order to maintain correct back EMF position sensing capability. According to the invention, however, lower current monitor 136 monitors the current in lower shunt $R_{LSHUNT}$ (i.e., the sum of the regulated motor current and the circulating current) to limit the current in inverter bridge 302 and the motor windings to a maximum allowed level.

Figure 3C:
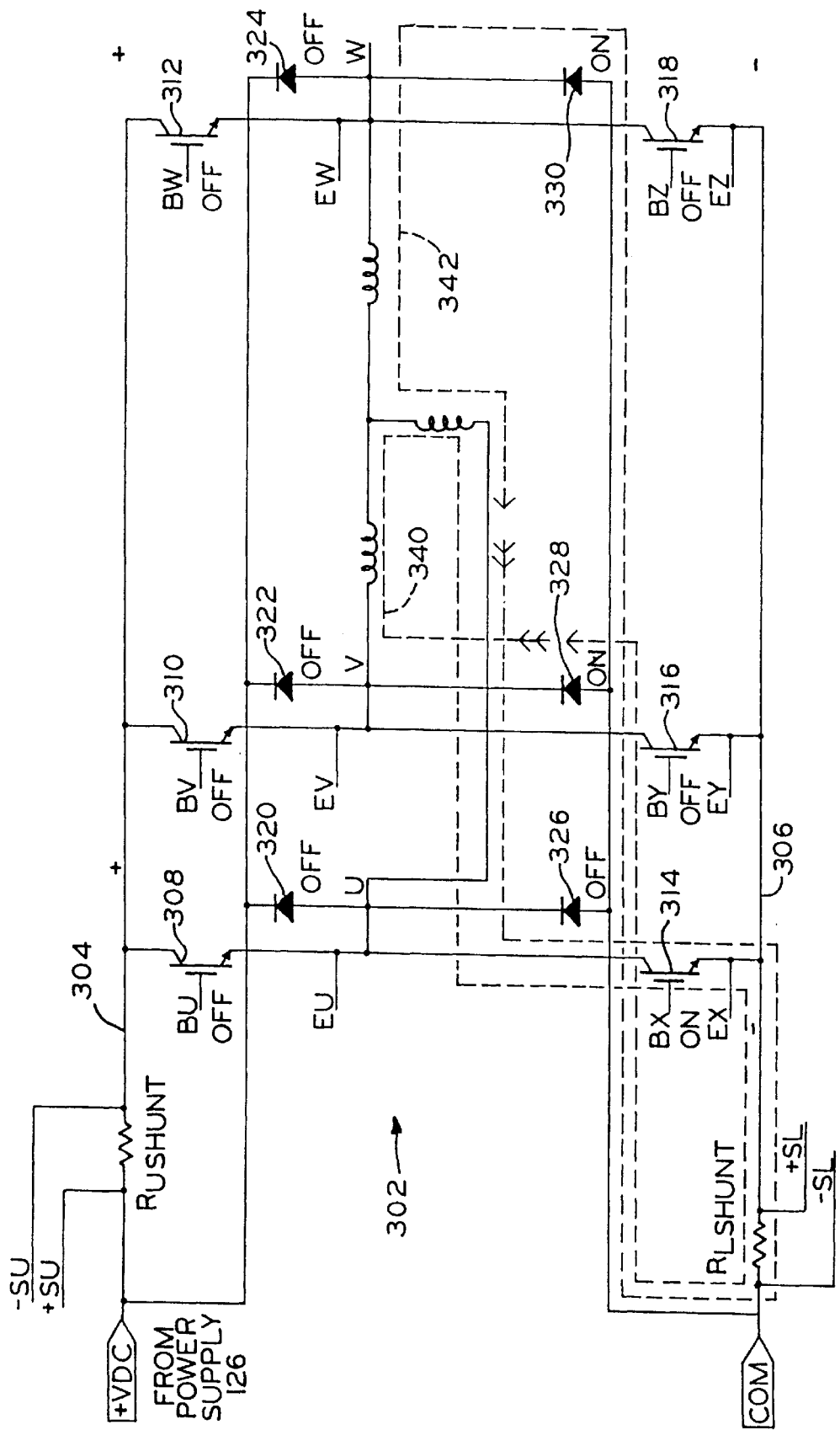

FIG. 3C also shows a circulating current path which exists when switch 312 is in a nonconducting state according to the pulse width modulation scheme. In contrast to FIG. 3B, FIG. 3C illustrates increasing circulating current flow resulting from an out-of-position condition when a failure to properly sense the position of rotor 106 occurs. Whereas the circulating current decays rapidly in normal operation because the motor back EMF opposes their flow, the back EMF of an out-of-position winding induces circulating current in inverter bridge 302. As shown in FIG. 3C, a circulating loop 340 under these circumstances includes the windings U and V of motor 102, switch 314 and diode 328. In this instance, circulating current does not flow in rail 304 and is not detectable in upper shunt $R_{USHUNT}$. According to the invention, however, lower current monitor 136 monitors the current in lower shunt $R_{LSHUNT}$ (i.e., the sum of the regulated motor current and the circulating current) to limit the current in inverter bridge 302 and the motor windings to a maximum allowed level following the timing out of the loss of position interval by a timer (see FIGS. 4 and 7). As such, the monitored current continues to increase only until initiation of the ALL OFF state at the end of the loss of position time interval timed by the timer.

Thus, as shown in FIGS. 3A–3C, the use of a resistive shunt in each polarity of the DC power supply 126 (i.e., $R_{USHUNT}$ and $R_{LSHUNT}$), with the flyback diode currents of inverter bridge 302 routed through the appropriate shunt, provides monitoring of the sum of link current and circulating current. In a preferred embodiment, monitoring this sum of currents permits regulation of motor current at commutation and further permits control of circulating currents that occur at a loss of position. Advantageously, the invention described herein provides relatively tight control of current resulting from a loss of position to prevent demagnetization. To do so, system 100 preferably monitors the summed effect of the circulating currents to within 30% of the maximum operating current.

It is to be understood that the conditions described above as occurring in the upper shunt $R_{USHUNT}$ alternately exist in the lower shunt $R_{LSHUNT}$, and vice versa, depending on which of the power switches 124 are enabled. For example, the currents shown in FIG. 3C that are developed in lower shunt $R_{LSHUNT}$ are alternately developed in upper shunt $R_{USHUNT}$. Advantageously, the present invention provides monitoring of the total current so that a competent out-of-position determination can be made with a reduced risk of false, or nuisance, overcurrent indications.

Referring now to FIG. 3D, in the event of unacceptable levels of circulating currents, current regulation circuit 134 generates an overcurrent signal which causes control circuit 114 to initiate an ALL OFF state. As described above, all of power switches 124, namely, each of the upper power switches 308, 310, 312 and each of the lower switches 314, 316, 318, are nonconducting in the ALL OFF state. If power switches 124 are all turned off, then the energy stored in the windings forces current through flyback diodes 320, 322, 324 to upper rail 304 and back to power supply 126. Current flows in the reverse direction until all of the energy stored in the windings is extracted. In this manner, abnormal circulating currents are reduced to an acceptable level.

In a preferred embodiment of the invention, either lower current monitor 136 or upper current monitor 138 monitored the current in its respective shunt (i.e., the sum of the regulated motor current and the circulating current) prior to initiation of the ALL OFF state. After the timing out of the loss of position timer, current regulation circuit 134 then acted to limit the current in inverter bridge 302 and the motor windings to a maximum allowed level by disabling power switches 124. Although current regulation circuit 134 is unable to observe the currents being directly returned to the bulk rail capacitor at either $R_{USHUNT}$ or $R_{LSHUNT}$, the opposing rail voltage forces the circulating current induced by the back EMF to decay for the duration of the ALL OFF state because the back EMF is less than the rail voltage.

In contrast to known systems, system 100 provides an economical and reliable means of continuously monitoring currents in inverter bridge 302 and motor 102. As such, the present invention permits the use of inverter and motor elements which have a lower current capacity than the capacity required to withstand uncontrolled motor circulating currents, prevents the development of large circulating currents, which can demagnetize the rotor magnets, and provides such protection of motor 102 and control circuit 114 against circulating currents involving the motor windings and elements of inverter bridge 302 without significantly degrading motor performance. For these reasons, the present invention is particularly applicable to low cost, small size electronically commutated motors which typically have greater inductance and, thus, are more susceptible to demagnetization and out-of-position circulating currents.

According to the invention, upper and lower current monitors 138, 136 detect loss of position conditions and distinguish these conditions from those that normally exist at commutation. During a loss of position, the turn off of the PWM transistor (e.g., switch 314, switch 316 or switch 318) does not produce an immediate reduction in current. Rather, the current continues to build due to the orientation of the back EMF in the windings. According to the invention, control circuit 114 may determine a loss of position in response to current regulation circuit 134 when the value of sensed current is greater than a maximum regulate value, when the sensed current exceeds the regulate value after PWM off for longer than a predefined interval or when the PWM transistor turns off during a predetermined interval of time following turn on. Advantageously, the present invention provides improved performance to reduce the risk of nuisance activation of the out-of-position response based on the duration of the response, the value of demagnetization current and the maximum desired current of the power devices.

FIG. 4 illustrates current regulation circuit 134, including lower and upper current monitors 136, 138, according to one preferred embodiment of the invention. In this embodiment, the current monitors 136, 138 compare the respective rail current to a substantially fixed threshold for detection of abnormal circulating currents and initiation of the out-of-position response. As illustrated, resistors 402, 404 constitute a single resistive element, i.e., the upper rail shunt $R_{USHUNT}$. A resistor network, generally indicated 406, provides the biasing for the fixed current trip threshold (i.e., the maximum current level). In this instance, a comparator 408 compares the voltage across resistors 402, 404 representing the current in upper rail 304 to the fixed voltage developed by the resistor network 406 representing the maximum allowed current level. Resistor network 406 preferably provides production trim of this fixed threshold to the range of approximately 13.1 to 14.1 amps.

FIG. 4 also shows the communication circuit 142 which provides communication between upper current monitor 138 and lower current monitor 136. In this embodiment of the invention, communication circuit 142 comprises a divider network, generally indicated 410, connected to a comparator 412 which generates a differential signal to communicate the status of upper rail shunt $R_{USHUNT}$ to lower current monitor 136. A transistor 414 provides a 60 volt input, for example, to communication circuit 142 to overcome errors which may be associated with the divider 410 and comparator 412 at 500+ rail volts with a one volt noise margin. In the alternative, communication circuit 142 may be embodied by an optocoupler isolated circuit (not shown).

In a preferred embodiment, lower rail fixed current monitor 136 includes a comparator 416 which is hard-wire connected with the upper to lower differential signal comparator 412 in communication circuit 142. This connection allows either fixed upper current monitor 138 or fixed lower current monitor 136 to pull a node 418 at the comparator 416 low. In this instance, resistors 420, 422 constitute a single resistive element (i.e., the lower rail shunt $R_{LSHUNT}$ of lower current monitor 136) and a resistor network, generally indicated 424, provides the biasing for the fixed current trip threshold (i.e., the maximum current level). The comparator 416 compares the voltage across resistors 420, 422 representing the current in lower rail 306 to the fixed voltage developed by the resistor network 424 representing the maximum allowed current level. Similar to upper current monitor 138, resistor network 424 preferably provides production trim of this fixed threshold to the range of approximately 13.1 to 14.1 amps.

Lower current monitor 136 further includes a comparator 426 for comparing the current in lower rail 306 to a variable current threshold. As described above, the ASIC of control circuit 114 outputs the SPOUT signal representing the peak regulated current level to lower current monitor 136 at line 140. In a preferred embodiment, SPOUT is a 5 volt duty-cycle-controlled 20 kHz signal representative of a variable peak regulated current level between approximately 0 and 12.5 amps. A resistor 428 and a capacitor 430 convert the duty cycle to an analog voltage (averaged) for variable current regulation of lower rail 306. As shown in FIG. 4, the variable input comparator 426 is preferably connected to the node 418 through a diode 432. This connection allows the output of comparator 408, comparator 414 or comparator 426 to pull the IREG pin of the ASIC of control circuit 114 low at line 144. According to the invention, current regulation circuit 134 instructs control circuit 114 to initiate a PWM off state by pulling IREG low. As described above, this allows the upper rail regulation of peak current at commutation.

A loss of position timer 434 provides an interval of time over which the sensed current exceeds the fixed current threshold before current regulation circuit 134 instructs control circuit 114 to initiate an out-of-position response. In a preferred embodiment, the timer 434 includes a transistor 436 for beginning the timing interval. When node 418 goes low, the base drive of the transistor 436 is removed which allows a capacitor 438 to charge through resistors 440, 442. Timer 434 also includes a transistor 444 connected to control circuit 114 via line 146 for providing the ON/OFF signal. As shown in FIG. 4, the transistor 444 turns off to initiate the out-of-position response when its bias current through the resistor 442 drops to a sufficiently low value (e.g., after approximately 45 microseconds). Control circuit 114 then determines the duration of the out-of-position response. In this instance, the diode 432 prevents the output of comparator 426 (i.e., the variable threshold portion of lower current monitor 136) from pulling node 418 low so that the variable current regulation level does not initiate an out-of-position response.

As described above, the magnitude of current increases during the interval before initiation of the out-of-position response. The amount of increase depends on the inductance, speed, and back EMF per RPM of motor 102. A ratio of demagnetization current to operating current of 1.2 provides for the magnitude of current which builds up at maximum speed during a loss of position over the interval of time that is used for the initiation of the out-of-position response. As an example, system 100 provides a ratio of circulating current to trip level of 1.14 for a 45 microsecond loss of position interval; a ratio of 1.21 for a 90 microsecond loss of position interval; a ratio of 1.27 for a 145 microsecond loss of position interval; and a ratio of 1.35 for a 190 microsecond loss of position interval. In the example, an acceptable interval of time to be timed out by the loss of position timer may be set at approximately 80 microseconds or less.

Figure 5A:
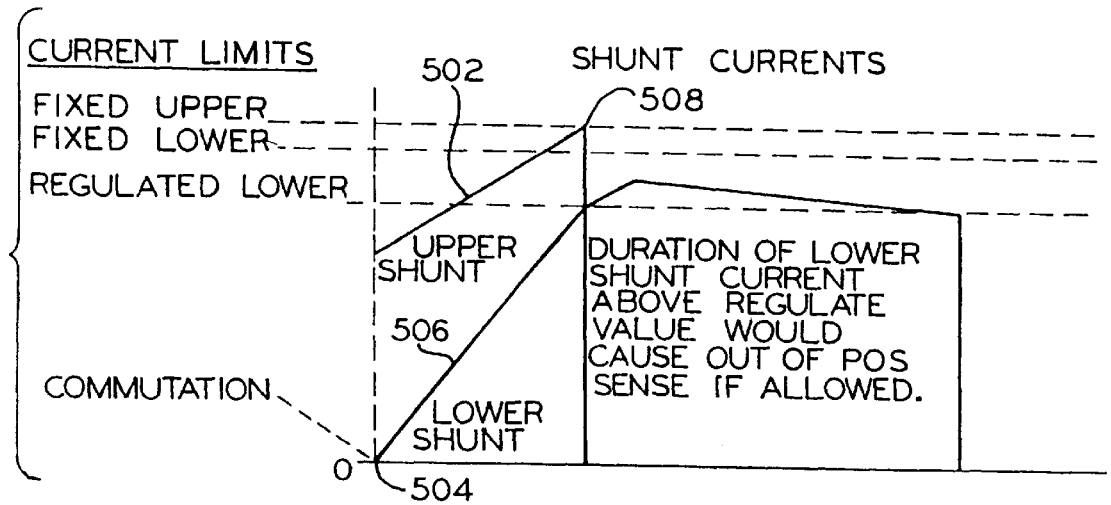
FIGS. 5A and 5B are exemplary timing diagrams illustrating the relationship between motor and shunt currents at low speed commutation for the upper and lower current monitors of FIG. 4.
Figure 5B:
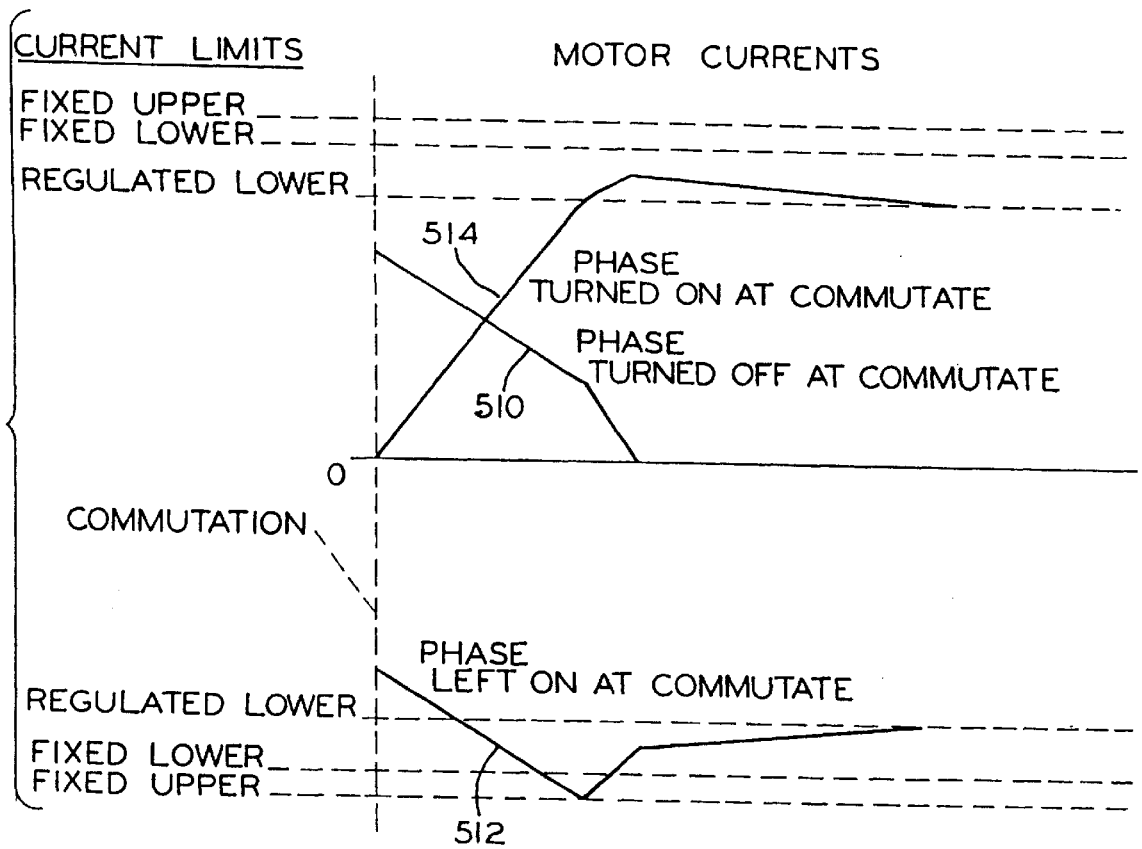

In general, FIGS. 5A and 5B and FIGS. 6A and 6B are exemplary timing diagrams illustrating the relationship between shunt and motor currents for the current regulation circuit 134 of FIG. 4. For clarity, the re-routed upper flyback diode currents are shown. In the embodiment of FIG. 4, current regulation circuit 134 employs both a current threshold (i.e., the maximum current regulation level) which is greater than the maximum current regulation level and times a loss of position interval for which the sensed current exceeds the threshold before initiating an out-of-position response. Preferably, comparators 408, 416 compare the sensed current to substantially fixed thresholds for limiting the maximum current to be allowed and comparator 426 compares the sensed current to a variable threshold for regulating current in motor 102 to control its torque and/or speed. According to the invention, the separate functions of the fixed and variable current limits permit system 100 to distinguish between out-of-position conditions and those that normally follow a commutation. FIGS. 5A and 5B illustrate this possibility of nuisance activation at commutation.

Referring now to FIG. 5A in particular, the current in upper shunt $R_{USHUNT}$ increases at low speed commutation according to a waveform 502 beginning at a commutation instance 504. Similarly, the lower shunt current increases according to a waveform 506 also beginning at the commutation instance 504. As shown, the upper shunt current of waveform 502 is greater than the lower shunt current of waveform 506 due to the presence of upper rail circulating current. The upper shunt current continues to build until reaching the fixed upper shunt current threshold shown at a point 508 when a PWM off state occurs and causes the upper shunt current of waveform 502 to decay. On the other hand, the lower shunt current of waveform 506 continues to build even as the circulating current at commutation completes its decay. Although the lower shunt current shown in waveform 506 exceeds the regulated level, it does not exceed the fixed lower shunt current threshold and, thus, does not initiate a false overcurrent tripping.

FIG. 5B illustrates the currents in the windings of motor 102 relative to the shunt currents shown in FIG. 5A. As shown, a waveform 510 represents the current in the phase turned off at commutation which decays to zero. A waveform 512 represents the current in the phase remaining on at commutation and a waveform 514 represents the current in the phase turned on at commutation. In this instance, the variable threshold portion of the lower current monitor 136 of current regulation circuit 134 regulates the current waveforms 512, 514.

The opportunity to use a timed interval before initiation of an out-of-position response to filter nuisance activations at commutation is limited by the duration of the lower shunt current exceeding the regulation level after commutation and after the PWM transistor turns off. Several parameters may affect the duration of current above the regulation level such as motor speed at commutation and the ratio of the fixed upper shunt current threshold to the variable lower shunt current threshold. For example, as the variable threshold for current regulation increases, the length of time that the current exceeds the regulation level increases until the variable threshold reaches about 95% of the fixed upper shunt current threshold. At this point, the duration of current exceeding the regulation level remains constant at greater than approximately 100 microseconds for 1800 RPM, for example. As the speed of motor 102 increases, the duration decreases. According to one preferred embodiment of the invention, the regulation level varies from zero to approximately 12.5 amps and the upper and lower shunt current thresholds are fixed at approximately 13.5 amps. In this instance, a loss of position interval of 45 microseconds may result in a nuisance trip at approximately 0.45 top no load speed; a loss of position interval of 90 microseconds may result in a nuisance trip at approximately 0.35 top no load speed; a loss of position interval of 145 microseconds may result in a nuisance trip at approximately 0.31 top no load speed; and a loss of position interval of 190 microseconds may result in a nuisance trip at approximately 0.27 top no load speed. As such, a maximum loss of position interval of 80 microseconds provides discrimination of normal versus out-of-position circulating currents only down to approximately 0.39 of top no load speed. For this reason, the present invention preferably provides a loss of position interval of approximately 45 microseconds.

Figure 6A:
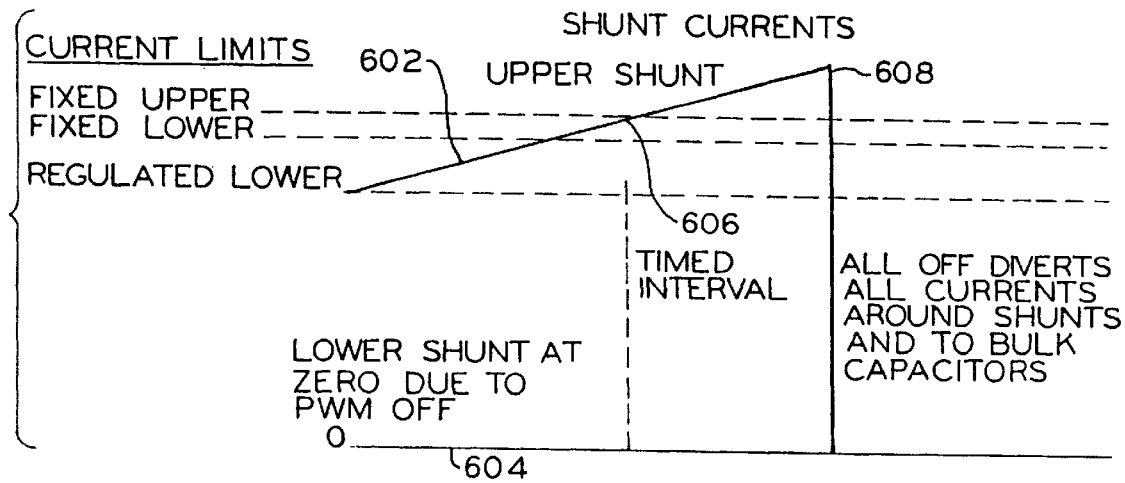
FIGS. 6A and 6B are exemplary timing diagrams illustrating the relationship between motor and shunt currents at loss of position for the upper and lower current monitors of FIG. 4.
Figure 6B:
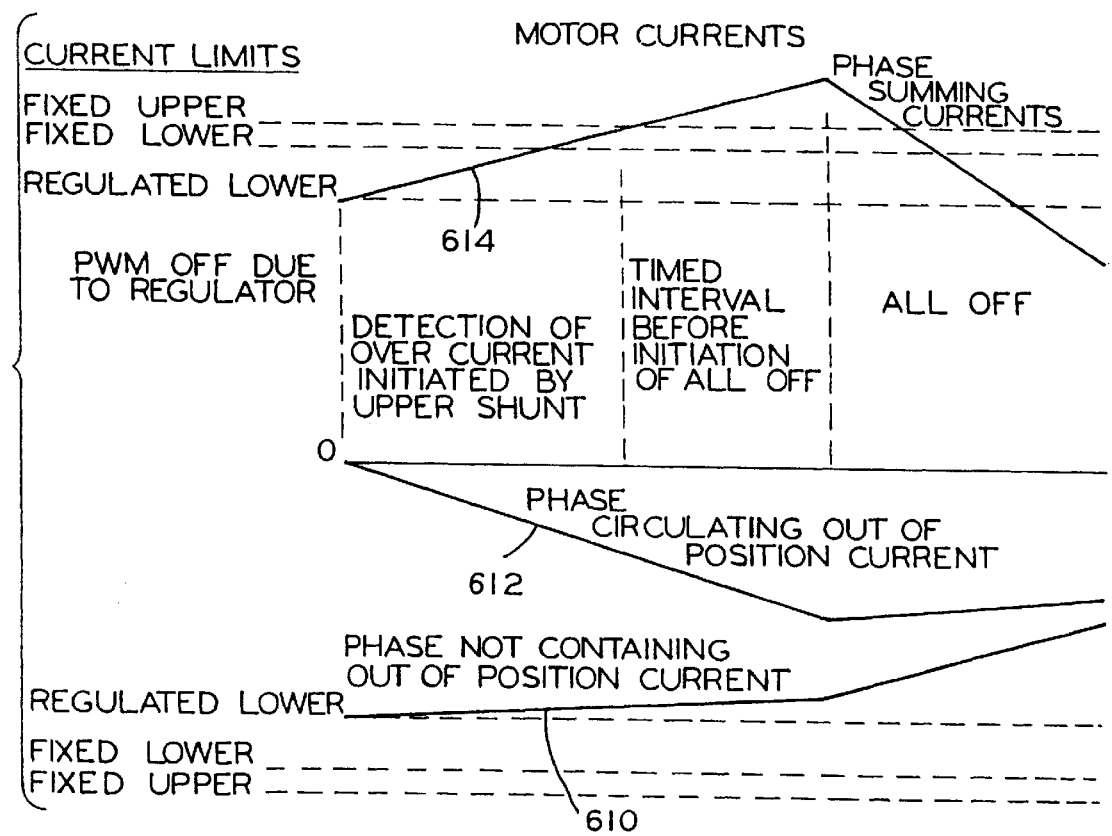

In FIGS. 6A and 6B, the shunt and motor currents are shown for detection of a loss of position and initiation of the out-of-position response. According to the example of FIGS. 6A and 6B, the current in upper shunt $R_{USHUNT}$ is used to detect out-of-position conditions in motor 102 because the lower shunt current is zero in the PWM off state and the motor currents are circulating in the upper rail 304. It is to be understood that the current in lower shunt $R_{LSHUNT}$ may also be used to detect and respond to a loss of position for those designs that alternate the PWM transistor between the upper and lower rail.

Referring now to FIG. 6A in particular, the upper shunt current increases according to a waveform 602 while the lower shunt current remains at zero according to a waveform 604. The upper shunt current continues to build until reaching the fixed upper shunt current threshold shown at a point 606. At the point 606, upper current monitor 138 determines the existence of an overcurrent condition and activates loss of position timer 434. After timing out the loss of position interval (shown at a point 608), timer 434 initiates the out-of-position response by instructing control circuit 114 to cause each of the power switches 124 to become nonconducting (i.e., the ALL OFF state). Once control circuit 114 initiates the ALL OFF state, current in inverter bridge 302 and motor 102 diverts to the bulk capacitor of the power supply link thereby to control the abnormal circulating current condition.

FIG. 6B illustrates the currents in the windings of motor 102 relative to the shunt currents shown in FIG. 6A. As shown, a waveform 610 represents the current in the phase not in the path of the circulating out-of-position current. A waveform 612 represents the current in the phase which is in the path of the circulating current and a waveform 614 represents the current in the phase which is in the path of both the circulating current and the regulated current.

According to the invention, current regulation circuit 134 as shown in FIG. 4 accommodates the conflict of nuisance trip elimination and loss of torque by separating the current regulation function from the detection of current in excess of the fixed upper shunt or lower shunt thresholds. Preferably, current regulation circuit 134 reserves the fixed upper and lower shunt current limits for determination of out-of-position conditions and, through an OR function, allows the upper shunt current limit as well as the variable lower shunt current regulation value to initiate PWM off state.

In the example of FIGS. 5A and 5B and FIGS. 6A and 6B, the fixed upper and lower shunt current limits are shown as different values only to demonstrate that they need not be identical. In a preferred embodiment, however, these thresholds are both set to approximately 6.5% greater than the maximum regulated current value.

Referring now to FIG. 7, an alternative embodiment of current regulation circuit 134 according to the invention is shown. In this embodiment, the current monitors 136, 138 compare the respective rail current to a variable threshold for detection of abnormal circulating currents and initiation of the out-of-position response. As shown, resistors 702, 704 constitute a single resistive element, i.e., the upper rail shunt $R_{USHUNT}$. A resistor network, generally indicated 706, provides the biasing for the current trip threshold (i.e., the maximum current level). In this instance, however, the resistor network 706 cooperates with an upper rail current magnitude communication circuit, generally indicated 708, to provide a variable threshold to a comparator 710. The comparator 710 compares the voltage across resistors 702, 704 representing the current in upper rail 304 to the variable voltage developed by resistor network 706 and communication circuit 708 representing the maximum allowed current level. Resistors 712, 714, which are part of resistor network 706, and jumpers 716, 718 preferably provide production trim of this variable threshold to match the variable current regulation level.

FIG. 7 also shows the communication circuit 142 which provides communication between upper current monitor 138 and lower current monitor 136 in a manner similar to that shown in FIG. 4. In this embodiment of the invention, communication circuit 142 comprises a divider network, generally indicated 720, connected to a comparator 722 which generates a differential signal to communicate the status of upper rail shunt $R_{USHUNT}$ to lower current monitor 136. A transistor 724 provides the input to the differential circuitry of communication circuit 142. The upper rail variable current magnitude communication circuit 708 includes a comparator 726 and also operates to provide differential mode communication in a manner similar to communication circuit 142.

As described above, the ASIC of control circuit 114 outputs the SPOUT signal representing the peak regulated current level to lower current monitor 136 at line 140. In a preferred embodiment, SPOUT is a 5 volt duty-cycle-controlled 20 kHz signal representative of a variable peak regulated current level between approximately 0 and 12.5 amps. A resistor 728 and a capacitor 730 convert the duty cycle to an analog voltage (averaged) for variable current regulation of lower rail 306. Likewise, a resistor 732 and a capacitor 734 convert the duty cycle to an analog voltage (averaged) for variable current regulation of upper rail 304. A transistor 736 provides a 60 volt input, for example, to differential communication circuit 708 to overcome errors associated with the divider 720 and the comparator 726 with acceptable noise margin.

In a preferred embodiment, the lower rail variable current monitor 136 includes a comparator 738 which is hard-wire connected at a node 740 to the differential signal comparator 722 in communication circuit 142. This connection allows either lower current monitor 136 or the current regulation portion of upper current monitor 138 (i.e., circuit 708) to pull the IREG pin of the ASIC of control circuit 114 low at line 144. According to the invention, current regulation circuit 134 instructs control circuit 114 to initiate a PWM off state by pulling IREG low.

A loss of position timer 742 provides an interval of time over which the sensed current exceeds the fixed current threshold before current regulation circuit 134 instructs control circuit 114 to initiate an out-of-position response. In a preferred embodiment, the timer 742 includes a comparator 744 for beginning the timing interval by performing an inversion function when node 740 goes low. This allows a capacitor 746 to charge through resistors 748, 750. Timer 742 also includes a transistor 752 connected to control circuit 114 via line 146 for providing the ON/OFF signal. As shown in FIG. 7, the transistor 752 turns off to initiate the out-of-position response when its bias current through the resistor 750 drops to a sufficiently low value (e.g., after approximately 45 microseconds).

In general, FIGS. 8A and 8B and FIGS. 9A and 9B are exemplary timing diagrams illustrating the relationship between shunt and motor currents for the current regulation circuit 134 of FIG. 7. In the embodiment of FIG. 7, current regulation circuit 134 employs both a current threshold which is related to the peak regulated current level and times a loss of position interval for which the sensed current exceeds the threshold before initiating an out-of-position response. Preferably, comparator 738 compares the sensed current to a variable threshold for regulating current in motor 102 to control its torque and/or speed and comparators 710, 738 compare the sensed current to variable thresholds for limiting the maximum current to be allowed. According to the invention, the variable thresholds for the lower and upper current monitors 136, 138 relate to each other to within a limited error which permits system 100 to distinguish between out-of-position conditions and those that normally follow a commutation.

Referring now to FIG. 8A in particular, the current in upper shunt $R_{USHUNT}$ increases at low speed commutation according to a waveform 802 beginning at a commutation instance 804. Similarly, the lower shunt current increases according to a waveform 806 also beginning at the commutation instance 804. As shown, the upper shunt current of waveform 802 is greater than the lower shunt current of waveform 806 due to the presence of upper rail circulating current. The upper shunt current continues to build until reaching the variable upper shunt current threshold, or regulated level, shown at a point 808 when a PWM off state occurs and causes the upper shunt current of waveform 802 to decay. On the other hand, the lower shunt current of waveform 806 continues to build even as the circulating current at commutation completes its decay. In this instance, the lower shunt current shown in waveform 806 may cause an out-of-position response if it continues to increase in excess of the variable lower shunt current threshold, or regulated level, for a length of time (i.e., the loss of position interval).

FIG. 8B illustrates the currents in the windings of motor 102 relative to the shunt currents shown in FIG. 8A. As shown, a waveform 810 represents the current in the phase turned off at commutation which decays to zero. A waveform 812 represents the current in the phase remaining on at commutation and a waveform 814 represents the current in the phase turned on at commutation. In this instance, current regulation circuit 134 regulates the current waveforms 812, 814 as a function of the variable thresholds.

In FIGS. 9A and 9B, the shunt and motor currents are shown for detection of a loss of position and initiation of the out-of-position response. According to the example of FIGS. 9A and 9B, the current in upper shunt $R_{SHUNT}$ is used to detect out-of-position conditions in motor 102 because the lower shunt current drops to zero due to the PWM off state and the motor currents are circulating in the upper rail 304. It is to be understood that the current in lower shunt $R_{LSHUNT}$ may also be used to detect and respond to a loss of position for those designs that alternate the PWM transistor between the upper and lower rail.

Referring now to FIG. 9A in particular, the upper shunt current increases according to a waveform 902 while the lower shunt current remains at zero according to a waveform 904. The upper shunt current continues to build until reaching the variable upper shunt current threshold shown at a point 906. At the point 906, upper current monitor 138 determines the existence of an overcurrent condition and activates loss of position timer 742. After timing out the loss of position interval (shown at a point 908), timer 742 initiates the out-of-position response by instructing control circuit 114 to cause each of the power switches 124 to become nonconducting (i.e., the ALL OFF state). Once control circuit 114 initiates the ALL OFF state, current in inverter bridge 302 and motor 102 diverts to the bulk capacitor of the power supply link thereby to control the abnormal circulating current condition.

FIG. 9B illustrates the currents in the windings of motor 102 relative to the shunt currents shown in FIG. 9A. As shown, a waveform 910 represents the current in the phase not in the path of the circulating out-of-position current. A waveform 912 represents the current in the phase which is in the path of the circulating current and a waveform 914 represents the current in the phase which is in the path of both the circulating current and the regulated current.

In the example of FIGS. 8A and 8B and FIGS. 9A and 9B, the variable upper and lower shunt current limits are preferably with approximately 2.5% of each other which provides for the use of a loss of position interval of approximately 50 microseconds.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A motor system comprising:
    a stationary assembly including windings;
    a rotatable assembly in magnetic coupling relation to the stationary assembly;
    a power supply link for providing power to the windings, said power supply link comprising an inverter bridge having upper and lower rails supplied by a power supply and having power switches responsive to a motor control signal for selectively connecting the rails to the windings in alternating on and off intervals to produce an electromagnetic field for rotating the rotatable assembly, said power switches each having a conducting state and a nonconducting state;
    a current sensing circuit for sensing current in each of the rails of the power supply link during both the on and off intervals of the power provided to the windings, said inverter bridge connecting the windings to the upper and lower rails such that current circulating in the power supply link and windings during the off intervals of the power provided to the windings is routed through the current sensing circuit;
    a current regulation circuit for generating an overcurrent signal as a function of the current sensed in either one of the rails exceeding a maximum current level; and
    a control circuit responsive to the overcurrent signal for causing each of the power switches to become nonconducting thereby to prevent excessive current from circulating in the motor system.

2. The motor system of claim 1 wherein the current regulation circuit comprises upper and lower rail current monitors for comparing the current in each of the rails to the maximum current level and wherein the current regulation circuit generates the overcurrent signal as a function of the comparison.

3. The motor system of claim 2 wherein the inverter bridge connects the windings to the upper and lower rails such that current circulating in the power supply link and windings is routed through either the upper rail current monitor or the lower rail current monitor.

4. The motor system of claim 3 wherein the power switches include a set of upper power switches and a set of lower power switches, each of the upper power switches being connected in series between the upper rail of the power supply link and one the windings and each of the lower power switches being connected in series between the lower rail of the power supply link and one of the windings, and wherein the upper rail current monitor is connected in series between the power supply and the upper power switches and the lower rail current monitor is connected in series between the power supply and the lower power switches.

5. The motor system of claim 4 wherein the inverter bridge includes a set of upper flyback diodes each corresponding to one of the upper power switches and a set of lower flyback diodes each corresponding to one of the lower power switches, each of the upper flyback diodes being connected in series between the power supply side of the upper rail current monitor and one of the windings and each of the lower flyback diodes being connected in series between the power supply side of the lower rail current monitor and one of the windings such that current circulating in the power supply link and windings is routed through either the upper rail current monitor or the lower rail current monitor.

6. The motor system of claim 1 wherein the current regulation circuit includes a timer for generating the overcurrent signal when the sensed current exceeds the maximum current level for a defined interval of time timed by the timer.

7. The motor system of claim 1 wherein the current sensing circuit senses current in one of the rails during the on intervals of the power provided to the windings and senses current in the other of the rails during the off intervals of the power provided to the windings.

8. The motor system of claim 1 wherein the current sensing circuit comprises a first resistive shunt in the upper rail of the power supply link between the power supply and the power switches and a second resistive shunt in the lower rail of the power supply link between the power supply and the power switches.

9. The motor system of claim 1 further comprising a shaft in driving relation with the rotatable assembly for driving a rotatable component.

10. A motor system comprising:
a stationary assembly including windings;
a rotatable assembly in magnetic coupling relation to the stationary assembly;
a power supply link for providing power to the windings, said power supply link comprising an inverter bridge having upper and lower rails supplied by a power supply and having power switches responsive to a motor control signal for selectively connecting the rails to the windings to produce an electromagnetic field for rotating the rotatable assembly, said power switches each having a conducting state and a nonconducting state;
a first resistive shunt in the upper rail of the power supply link between the power supply and the power switches for sensing current in the upper rail;
a second resistive shunt in the lower rail of the power supply link between the power supply and the power switches for sensing current in the upper rail, said inverter bridge connecting the windings to the upper and lower rails such that current circulating in the power supply link and windings during the off intervals of the power provided to the windings is routed through either the first resistive shunt or the second resistive shunt;
a current regulation circuit for generating an overcurrent signal as a function of the current sensed in either the first or second resistive shunt exceeding a maximum current level; and
a control circuit responsive to the overcurrent signal for causing each of the power switches to become nonconducting thereby to prevent excessive current from circulating in the motor system.

11. A system for driving a rotatable component comprising:
a motor having a stationary assembly and a rotatable assembly in magnetic coupling relation to the stationary assembly, said stationary assembly including windings, said rotatable assembly being in driving relation to the rotatable component;
a power supply link for providing power to the windings, said power supply link comprising an inverter bridge having upper and lower rails supplied by a power supply and having power switches responsive to a motor control signal for selectively connecting the rails to the windings in alternating on and off intervals to produce an electromagnetic field for rotating the rotatable assembly, said power switches each having a conducting state and a nonconducting state;
a current sensing circuit for sensing current in each of the rails of the power supply link during both the on and off intervals of the power provided to the windings, said inverter bridge connecting the windings to the upper and lower rails such that current circulating in the power supply link and windings during the off intervals of the power provided to the windings is routed through the current sensing circuit;
a current regulation circuit for generating an overcurrent signal as a function of the current sensed in either one of the rails exceeding a maximum current level; and
a control circuit responsive to the overcurrent signal for causing each of the power switches to become nonconducting thereby to prevent excessive current from circulating in the motor.

12. A protective circuit for a motor, said motor having a stationary assembly including windings and having a rotatable assembly in magnetic coupling relation to the stationary assembly, said motor also having a control circuit for generating a motor control signal and a power supply link for providing power to the windings, said power supply link comprising an inverter bridge having upper and lower rails supplied by a power supply and having power switches responsive to the motor control signal for selectively connecting the rails to the windings in alternating on and off intervals to produce an electromagnetic field for rotating the rotatable assembly, said protective circuit comprising:
a current sensing circuit for sensing current in each of the rails of the power supply link during both the on and off intervals of the power provided to the windings;
a circuit for routing current circulating in the power supply link and windings during the off intervals of the power provided to the windings through the current sensing circuit;
a current regulation circuit for generating an overcurrent signal as a function of the current sensed in either one of the rails exceeding a maximum current level; and
wherein the control circuit is responsive to the overcurrent signal for causing each of the power switches to become nonconducting thereby to prevent excessive current from circulating in the motor.

13. A method of controlling circulating currents in a motor, said motor having a stationary assembly including windings and having a rotatable assembly in magnetic coupling relation to the stationary assembly, said motor also having a power supply link for providing power to the windings, said power supply link including upper and lower rails supplied by a power supply and power switches each having a conducting state and a nonconducting state, said method comprising the steps of:
selectively connecting the rails to the windings in alternating on and off intervals with the power switches to produce an electromagnetic field for rotating the rotatable assembly, said power switches being responsive to a motor control signal;
routing current circulating in the power supply link and windings during the off intervals of the power provided to the windings through a current sensing circuit;
sensing current with the current sensing circuit in each of the rails of the power supply link during both the on and off intervals of the power provided to the windings;
generating an overcurrent signal as a function of the current sensed in either one of the rails exceeding a maximum current level; and
generating the motor control signal as a function of the overcurrent signal for causing each of the power switches to become nonconducting thereby to prevent excessive current from circulating in the motor.

14. The method of claim 13 wherein the step of generating the overcurrent signal includes comparing the current in the upper rail to the maximum current level with an upper rail current monitor and comparing the current in the lower rail to the maximum current level with a lower rail current monitor and includes generating the overcurrent signal as a function of the comparison.

15. The method of claim 14 wherein the power supply link comprises an inverter bridge connecting the windings to the upper and lower rails and wherein the current routing step comprises routing the current circulating in the power supply link and windings through either the upper rail current monitor or the lower rail current monitor.

16. The method of claim 15 wherein the power switches include a set of upper power switches and a set of lower power switches, each of the upper power switches being connected in series between the upper rail of the power supply link and one the windings and each of the lower power switches being connected in series between the lower rail of the power supply link and one of the windings, and further comprising the step of connecting the upper rail current monitor in series between the power supply and the upper power switches and connecting the lower rail current monitor in series between the power supply and the lower power switches.

17. The method of claim 16 wherein the inverter bridge includes a set of upper flyback diodes each corresponding to one of the upper power switches and a set of lower flyback diodes each corresponding to one of the lower power switches, and wherein the step of routing the current circulating in the power supply link and windings through either the upper rail current monitor or the lower rail current monitor includes connecting each of the upper flyback diodes in series between the power supply side of the upper rail current monitor and one of the windings and connecting each of the lower flyback diodes in series between the power supply side of the lower rail current monitor and one of the windings.

18. The method of claim 13 wherein the step of generating the overcurrent signal includes timing an interval during which the sensed current exceeds the maximum current level and generating the overcurrent signal when the timed interval reaches a pre-defined length.

19. The method of claim 13 wherein the step of sensing current in the rails includes sensing current in one of the rails during the on intervals of the power provided to the windings and sensing current in the other of the rails during the off intervals of the power provided to the windings.

20. The method of claim 13 wherein the step of sensing current in the rails includes connecting a first resistive shunt in the upper rail of the power supply link between the power supply and the power switches and connecting a second resistive shunt in the lower rail of the power supply link between the power supply and the power switches.

21. The method of claim 13 further comprising a shaft in driving relation with the rotatable assembly for driving a rotatable component.

22. A motor system comprising:
a stationary assembly including windings;
a rotatable assembly in magnetic coupling relation to the stationary assembly;
a power supply link for providing power to the windings, said power supply link comprising an inverter bridge having upper and lower rails supplied by a power supply and having power switches responsive to a motor control signal for selectively connecting the rails to the windings in alternating on and off intervals to produce an electromagnetic field for rotating the rotatable assembly, said power switches each having a conducting state and a nonconducting state;
a current sensing circuit for sensing current in each of the rails of the power supply link during both the on and off intervals of the power provided to the windings, said inverter bridge connecting the windings to the upper and lower rails such that current circulating in the power supply link and windings is routed through the current sensing circuit;
a current regulation circuit for generating an overcurrent signal as a function of the current sensed in either one of the rails exceeding a maximum current level, said current regulation circuit comprising a comparator circuit for comparing the current sensed in one of the rails to a peak regulated current level representative of a desired torque and/or speed of the motor, said current regulation circuit generating a current regulation signal representative of the comparison; and
a control circuit responsive to the overcurrent signal for causing each of the power switches to become nonconducting thereby to prevent excessive current from circulating in the motor system, said control circuit being responsive to the current regulation circuit for generating the motor control signal as a function of the current regulation signal to regulate current in the windings and control the torque and/or speed of the motor.

23. The motor system of claim 22 wherein the power switches are responsive to the motor control signal to pulse width modulate the power provided to the windings by the power supply link at a duty cycle which is a function of the current regulation signal.

24. A motor system comprising:
a stationary assembly including windings;
a rotatable assembly in magnetic coupling relation to the stationary assembly;
a power supply link for providing power to the windings, said power supply link comprising an inverter bridge having upper and lower rails supplied by a power supply and having power switches responsive to a motor control signal for selectively connecting the rails to the windings in alternating on and off intervals to produce an electromagnetic field for rotating the rotatable assembly, said power switches each having a conducting state and a nonconducting state;
a current sensing circuit for sensing current in each of the rails of the power supply link during both the on and off intervals of the power provided to the windings, said inverter bridge connecting the windings to the upper and lower rails such that current circulating in the power supply link and windings is routed through the current sensing circuit;
a current regulation circuit for generating an overcurrent signal as a function of the current sensed in either one of the rails exceeding a maximum current level, said maximum current level being variable as a function of a peak regulated current level; and
a control circuit responsive to the overcurrent signal for causing each of the power switches to become nonconducting thereby to prevent excessive current from circulating in the motor system.

25. A method of controlling circulating currents in a motor, said motor having a stationary assembly including windings and having a rotatable assembly in magnetic coupling relation to the stationary assembly, said motor also having a power supply link for providing power to the windings, said power supply link including upper and lower rails supplied by a power supply and power switches each having a conducting state and a nonconducting state, said method comprising the steps of:

selectively connecting the rails to the windings in alternating on and off intervals with the power switches to produce an electromagnetic field for rotating the rotatable assembly, said power switches being responsive to a motor control signal;

routing current circulating in the power supply link and windings through a current sensing circuit;

sensing current with the current sensing circuit in each of the rails of the power supply link during both the on and off intervals of the power provided to the windings;

generating an overcurrent signal as a function of the current sensed in either one of the rails exceeding a maximum current level;

comparing the current sensed in one of the rails to a peak regulated current level representative of a desired torque and/or speed of the motor;

generating a current regulation signal representative of the comparison; and generating the motor control signal as a function of the overcurrent signal for causing each of the power switches to become nonconducting thereby to prevent excessive current from circulating in the motor and generating the motor control signal as a function of the current regulation signal to regulate current in the windings and control the torque and/or speed of the motor.

26. The method of claim 25 further comprising the step of pulse width modulating the power provided to the windings by the power supply link at a duty cycle which is a function of the current regulation signal.

27. A method of controlling circulating currents in a motor, said motor having a stationary assembly including windings and having a rotatable assembly in magnetic coupling relation to the stationary assembly, said motor also having a power supply link for providing power to the windings, said power supply link including upper and lower rails supplied by a power supply and power switches each having a conducting state and a nonconducting state, said method comprising the steps of:

selectively connecting the rails to the windings in alternating on and off intervals with the power switches to produce an electromagnetic field for rotating the rotatable assembly, said power switches being responsive to a motor control signal;

routing current circulating in the power supply link and windings through a current sensing circuit;

sensing current with the current sensing circuit in each of the rails of the power supply link during both the on and off intervals of the power provided to the windings;

generating an overcurrent signal as a function of the current sensed in either one of the rails exceeding a maximum current level;

varying the maximum current level as a function of a peak regulated current level; and generating the motor control signal as a function of the overcurrent signal for causing each of the power switches to become nonconducting thereby to prevent excessive current from circulating in the motor.

* * * * *